United States Patent
Yoshikawa

(10) Patent No.: US 8,870,401 B2
(45) Date of Patent: Oct. 28, 2014

(54) LIGHTING DEVICE, DISPLAY DEVICE AND TELEVISION RECEIVER

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 263 days.

(21) Appl. No.: 13/574,730

(22) PCT Filed: Jan. 11, 2011

(86) PCT No.: PCT/JP2011/050248
§ 371 (c)(1),
(2), (4) Date: Jul. 23, 2012

(87) PCT Pub. No.: WO2011/096246
PCT Pub. Date: Aug. 11, 2011

(65) Prior Publication Data
US 2012/0293729 A1 Nov. 22, 2012

(30) Foreign Application Priority Data

Feb. 2, 2010 (JP) ................................. 2010-021429

(51) Int. Cl.
*F21V 21/00* (2006.01)
*F21V 8/00* (2006.01)

(52) U.S. Cl.
CPC .............. *G02B 6/009* (2013.01); *G02B 6/0068* (2013.01); *G02B 6/0073* (2013.01); *G02B 6/0091* (2013.01)
USPC ...................................................... 362/97.1

(58) Field of Classification Search
None
See application file for complete search history.

(56) References Cited

U.S. PATENT DOCUMENTS

| 2009/0039380 A1 | 2/2009 | Inui et al. |
| 2011/0007231 A1 | 1/2011 | Takata |
| 2011/0007239 A1 | 1/2011 | Hamada |
| 2011/0141402 A1 | 6/2011 | Hayashi |

FOREIGN PATENT DOCUMENTS

| JP | 2004-309967 A | 11/2004 |
| JP | 2007-234375 A | 9/2007 |
| JP | 2007-329394 A | 12/2007 |
| JP | 2008-108551 A | 5/2008 |
| JP | 2009-110811 A | 5/2009 |
| JP | 2009-296021 A | 12/2009 |
| WO | 2009/110316 A1 | 9/2009 |
| WO | 2009/118941 A1 | 10/2009 |
| WO | 2010/004610 A1 | 1/2010 |
| WO | 2010/004824 A1 | 1/2010 |

OTHER PUBLICATIONS

Machine translation of JP 2008-108551 A May 8, 2008.*
Official Communication issued in International Patent Application No. PCT/JP2011/050248, mailed on Mar. 15, 2011.

* cited by examiner

*Primary Examiner* — Britt D Hanley
(74) *Attorney, Agent, or Firm* — Keating & Bennett, LLP

(57) ABSTRACT

It is an object of the present invention to achieve cost reduction or the like in a lighting device. A backlight unit 12 according to the present invention includes: LEDs 17 as a plurality of light sources; at least two LED boards 18 on which the LEDs 17 are mounted; a chassis 14 in which the at least two LED boards 18 are housed; and a connecting and retaining member 22. The at least two LED boards 18 include ones arranged adjacent to each other. The adjacent LED boards 18 are electrically connected to each other and retained on the chassis 14 by the connecting and retaining member 22.

31 Claims, 20 Drawing Sheets

FIG.1
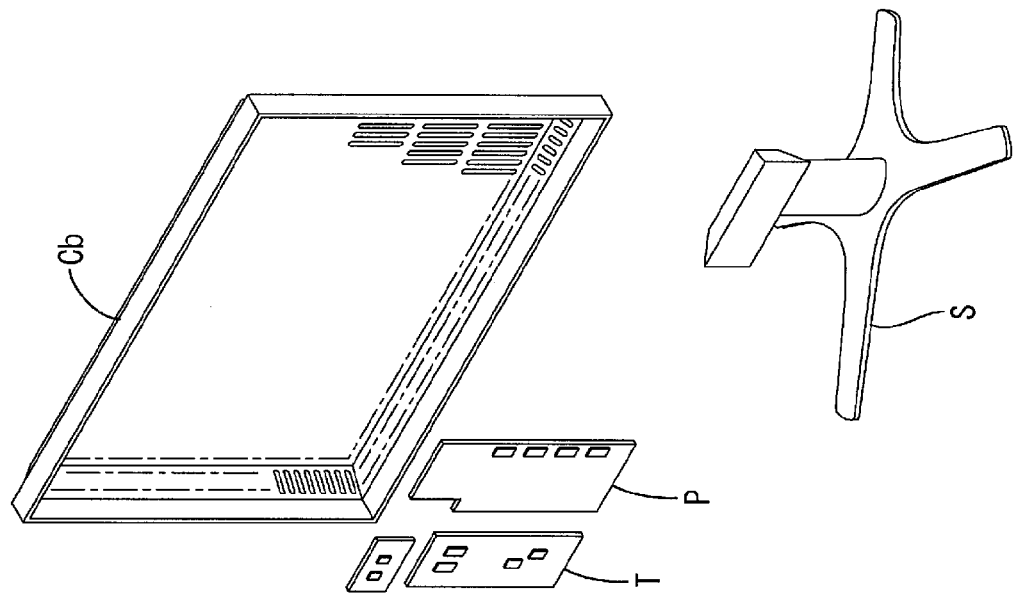
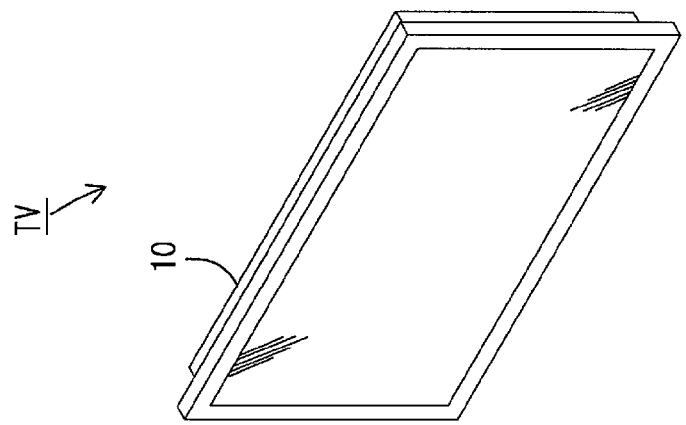
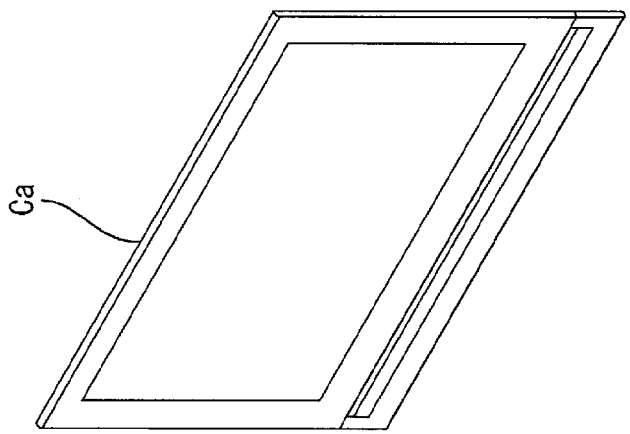

FIG.18
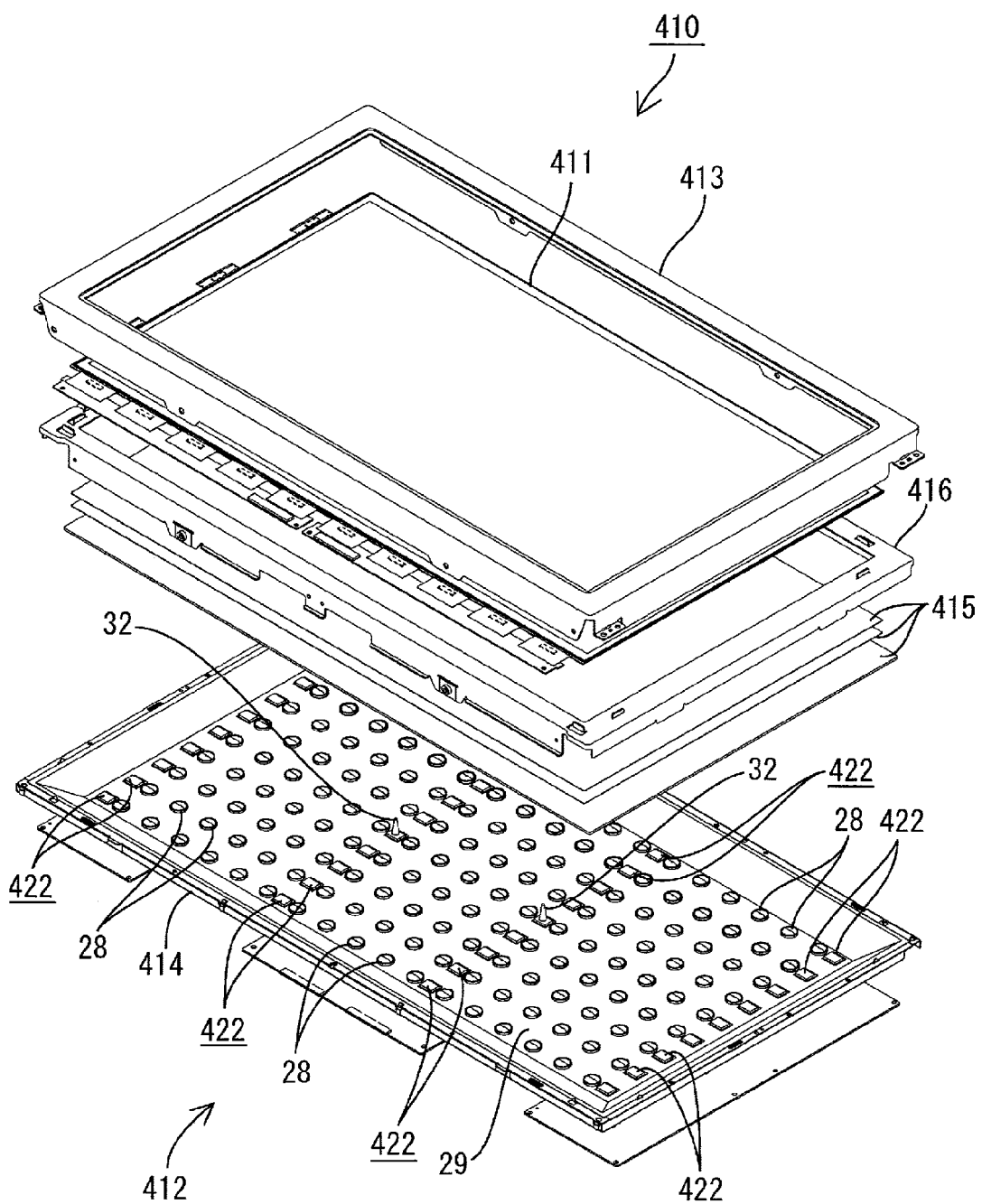
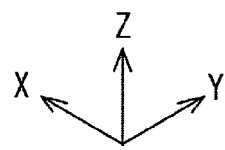

US 8,870,401 B2

LIGHTING DEVICE, DISPLAY DEVICE AND TELEVISION RECEIVER

TECHNICAL FIELD

The present invention relates to a lighting device, a display device, and a television receiver.

BACKGROUND ART

A liquid crystal panel used in a liquid crystal display device, such as a liquid crystal television set, does not emit light by itself. Thus, the liquid crystal panel uses a backlight unit as a separate lighting device. This backlight unit is installed on a back side (on a side opposite to the display surface) of the liquid crystal panel and includes: a chassis having an opening on the liquid crystal panel side; alight source housed in the chassis; and an optical member (such as a diffuser sheet) arranged at the opening of the chassis for causing the light emitted from the light source to be efficiently output toward the liquid crystal panel side.

In the backlight unit of the above configuration, in order to reduce power consumption, for example, an LED may be used as a light source, as described in Patent Document 1 indicated below. The example according to Patent Document 1 includes a flexible wiring board (LED board) on which the LED is mounted, and a light guide plate that guides light from the LED toward an optical member. The flexible wiring board is retained by a retaining structure configured to be locked on both of the LED and the light guide plate.

Patent Document 1: Japanese Unexamined Patent Publication No. 2007-234375

Problem to be Solved by the Invention

However, in the example according to Patent Document 1, the retaining structure needs to be specially designed to retain the LED and the light guide plate separately, resulting in an increase in their manufacturing cost. Thus, in order to achieve cost reduction, a retaining member retaining the flexible wiring board (LED board) with respect to the chassis may be prepared separately from the light guide plate or the like, thereby to retain a plurality of members such as a flexible wiring board and a light guide plate.

When in the case where a plurality of flexible wiring boards is used, the need arises to electrically connect adjacent flexible wiring boards, it is necessary, in addition to a retaining member for each flexible wiring board, to newly prepare connecting parts, such as connectors, for electrical connection separately from the retaining members. However, this increases the number of components and thereby the number of their assembly steps, which may result in an increase in cost.

DISCLOSURE OF THE PRESENT INVENTION

The present invention was made in view of the above circumstances and an object of the present invention is to reduce cost, for example.

Means for Solving the Problem

A lighting device according to the present invention includes: a plurality of light sources; at least two light source boards on which the light sources are mounted; a chassis housing the at least two light source boards; and at least one connection and retaining member. The at least two light source boards include light source boards arranged adjacent to each other, and the adjacent light source boards are electrically connected to each other and retained on the chassis with a connecting and retaining member.

In this way, the adjacent light source boards of the at least two light source boards are mutually electrically connected and also retained on the chassis by the connecting and retaining member. Thus, the connecting and retaining member according to the present invention has both the connecting function of electrically connecting the adjacent light source boards and the retaining function of retaining the adjacent light source boards. Accordingly, the number of components and the assembly steps can be decreased, and thereby cost reduction can be achieved compared to the case separately with retaining members individually retaining the light source boards and connecting members electrically connecting the adjacent light source boards.

Further, according to the present invention, at least two light source boards are provided and the adjacent light source boards are electrically connected by the connecting and retaining member. Thus, the number of light source boards installed can be readily increased. Therefore, the size of the lighting device can be suitably increased. Further, depending on the arrangement of the adjacent light source boards, expansion or contraction of the light source boards due to thermal expansion or thermal contraction is acceptable.

Embodiments of the present invention may include the following configurations.

(1) The adjacent light source boards may have a gap therebetween. In this way, even when the light source boards are subjected to thermal expansion or thermal contraction, the expansion or contraction of the light source boards is acceptable by the gap between the adjacent light source boards. Thus, deformation of the light source boards, such as warping, due to thermal expansion or thermal contraction can be prevented.

(2) The at least two light source boards may have an elongated shape and may be arranged parallel to each other along a long side direction thereof. The elongated light source board is subjected to a larger expansion or contraction in the long side direction than in the short side direction upon thermal expansion or thermal contraction. Thus, by providing a gap between the light source boards arranged parallel to each other along the long side direction, expansion or contraction of the light source boards in the long side direction due to thermal expansion or thermal contraction can be suitably accepted. Therefore, deformation of the light source boards can be effectively prevented. Further, the size of the lighting device can be suitably increased.

(3) A plurality of the light sources may be arranged parallel to each other on the at least two light source boards along the long side direction. In this way, a plurality of the light sources can be efficiently arranged on the light source boards. Therefore, high brightness can be suitably obtained.

(4) The connecting and retaining member may include a fixing portion to be fixed to the chassis, and the fixing portion may be arranged between the adjacent light source boards. In this way, because the fixing portion to be fixed to the chassis is arranged between the adjacent light source boards, the stress associated with the fixing can be prevented from directly acting on the light source boards. Thus, expansion or contraction of the light source boards due to thermal expansion or thermal contraction can be more suitably accepted.

(5) The connecting and retaining member may sandwich the adjacent light source boards with the chassis. In this way, the adjacent light source boards are sandwiched between the chassis and the connecting and retaining member. Therefore, a retained state and a connected state can be stably maintained.

(6) The connecting and retaining member may have substantially the same overlapping area with respect to the adjacent light source boards. In this way, substantially the same retaining force can be imparted from the connecting and retaining member to each of the adjacent light source boards. Therefore, the retained state and the connected state can be more stably maintained.

(7) The adjacent light source boards may include a wiring pattern connected to the light sources on the light source mounting surface, the connecting and retaining member may include a wiring portion on the surface opposed to the adjacent light source boards, and the wiring portion may be abutted on the wiring pattern. In this way, when the light source boards are sandwiched between the connecting and retaining member and the chassis, the wiring portion of the connecting and retaining member is abutted on the wiring pattern of the light source boards, whereby the adjacent light source boards are electrically connected to each other. Because the light source boards with the wiring pattern formed on the light source mounting surface can be used, the cost associated with the light source boards can be decreased compared to the case with the wiring pattern formed on the opposite surface of the light source mounting surface.

(8) The wiring portion may be entirely exposed to the adjacent light source boards. In this way, even when some displacement occurs in the attached position of the connecting and retaining member with respect to the light source boards, the wiring portion, which is entirely exposed to the light source boards, can be reliably abutted on the wiring pattern. Thus, excellent connection reliability can be obtained.

(9) The wiring pattern may include an abutted portion to be abutted on the wiring portion at an end portion of the adjacent light source boards. In this way, the end portion of the light source boards can be sandwiched between the connecting and retaining member and the chassis. Therefore, the wiring portion can be abutted on the wiring pattern while the adjacent light source boards are retained.

(10) The connecting and retaining member may be formed in a mountain shape spreading out toward the light source mounting surface of the adjacent light source boards. In this way, steps between the surface of the connecting and retaining member and the light source mounting surface of the light source boards are not likely to occur. Therefore, the dark areas due to steps can be prevented. Accordingly, uneven brightness can be suitably prevented.

(11) The connecting and retaining member may include an inclined surface. In this way, the light from the light sources can be angled as it is reflected by the inclined surface.

(12) The connecting and retaining member may be abutted on side surfaces of the adjacent light source boards, which are adjacent to both the light source mounting surface and an opposite surface of the light source mounting surface. In this way, the connecting and retaining member is abutted on both the light source mounting surface and the side surfaces of the light source boards. Therefore, a large contact area of can be obtained between the light source boards and the connecting and retaining member. Thus, the heat generated from the light source boards when the light sources are turned on can be efficiently transmitted to the connecting and retaining member. Consequently, a high heat dissipating property can be obtained.

(13) One of the side surfaces of the adjacent light source boards may be abutted on the connecting and retaining member, and the other of the side surfaces on an opposite side may be abutted on the chassis. In this way, the heat generated from the light source boards when the light sources are turned on can be efficiently transmitted to the connecting and retaining member and the chassis. Therefore, a higher heat dissipating property can be obtained.

(14) The connecting and retaining member may have a white surface. In this way, the light from the light sources can be efficiently reflected by the surface of the connecting and retaining member. Therefore, the light use efficiency can be increased.

(15) The at least two light source boards may have an elongated shape and be arranged parallel to each other along a long side direction thereof, and the connecting and retaining member may have a width dimension substantially the same as a short side dimension of the light source boards. In this way, the outer edge of the light source boards on the short side direction thereof flush with the outer edge of the connecting and retaining member in the width direction thereof. Thus, no step is produced between the adjacent light source boards and the connecting and retaining member. Therefore, the dark areas due to steps are prevented. Accordingly, uneven brightness can be suitably prevented.

(16) The at least two light source boards may have an elongated shape and be arranged parallel to each other along a long side direction thereof. The connecting and retaining member may have a width dimension larger than a short side dimension of the adjacent light source boards. And the connecting and retaining member may include a fixing portion to be fixed to the chassis, the fixing portion projecting out beyond the adjacent light source boards. In this way, because the fixing portion is provided at the portion of the connecting and retaining member that projects out beyond the light source boards, electrical connection between the light source boards and the connecting and retaining member can be achieved via the entire areas of their opposed surfaces. Thus, a high degree of freedom can be obtained in designing the electrically connection configuration of the light source boards and the connecting and retaining member.

(17) At least a pair of the fixing portions may be arranged across the adjacent light source boards. In this way, the light source boards can be more stably retained, and the electrical connection state can be stably maintained.

(18) The fixing portions may be arranged at the four corners of the connecting and retaining member. In this way, the connecting and retaining member can be stably fixed with respect to the chassis. Therefore, the adjacent light source boards can be more stably retained.

(19) The connecting and retaining member may have a rotationally symmetric shape of two-fold symmetry. In this way, the connecting and retaining member can be attached to the adjacent light source boards with high workability.

(20) The at least two light source boards may have white surfaces. In this way, the light from the light sources can be efficiently reflected by the surface of the light source board. Therefore, the light use efficiency can be increased.

(21) The lighting device may further include a light guide member, and the light guide member may include an end portion opposed to the light sources on the at least two light source boards. In this way, by retaining the adjacent light source boards onto the chassis with the connecting and retaining member, the light from the light sources can be incident on the end portion of the light guide member in an excellent manner. Further, depending on the arrangement of the adjacent light source boards, expansion or contraction of the light source boards due to thermal expansion or thermal contraction is acceptable. Therefore, deformation of the light source boards, such as warping, is not likely to occur. Thus, a constant positional relationship can be maintained between the light guide member and the light sources, whereby the light incidence efficiency from the light sources on the light guide member can be stabilized.

(22) The chassis may include a bottom portion supporting the light guide member, and side portions rising from the bottom portion and sandwiching the adjacent light source boards with the connecting and retaining member. In this way, by sandwiching the adjacent light source boards between the side portion rising from the bottom portion of the chassis and the connecting and retaining member, the retained state and the connected state can be stably maintained.

(23) The lighting device may further include a pair of reflection members. The light sources and the end portion of the light guide member opposed to the light sources may be arranged apart from each other with a space there between. The pair of reflection members may be arranged across the space. In this way, the light emitted by the light sources is repeatedly reflected by the pair of reflection members in the space between the light sources and the end portion of the light guide member opposed thereto. Therefore, the light can be efficiently incident on the end portion of the light guide member. Accordingly, the light use efficiency can be increased.

(24) The lighting device may further include an optical member. The chassis may include a bottom portion arranged on a side opposite to the light output side with respect to the at least two light source boards and supporting the light source boards, and the optical member is arranged on the light output side in such a manner as to be opposed to the bottom portion and the light source boards. In this way, the light emitted by the light sources on the light source boards is radiated onto the optical member, which is arranged on the light output side in an opposed manner with respect to the bottom portion and the light source boards, and the light is then emitted to the outside via the optical member.

(25) The connecting and retaining member may include a support portion projecting toward the light output side and supporting the optical member. In this way, a constant interval can be maintained between the light sources and the optical member. Therefore, unevenness in output light is not likely to occur.

(26) The at least two light source boards may have an elongated shape and be arranged parallel to each other along a long side direction thereof, and the at least two light source boards may include a plurality of types of light source boards with different lengths with respect to the long side direction. In this way, it becomes possible to use a plurality of the light source boards with different lengths in the long side direction in combination, to arrange parallel to each other along the long side direction. Thus, a plurality of types of the lighting device with different sizes can be appropriately manufactured.

(27) The at least two light source boards may include a group of the light source boards arranged parallel to each other along the long side direction and connected to each other by the connecting and retaining member. A plurality of the groups of light source boards may be arranged side by side intermittently along the short side direction of the at least two light source boards. In this way, the size of the lighting device can be suitably increased.

(28) The lighting device may further include a diffuser lens on the light output side of the light sources to diffuse the light from the light sources. In this way, the light emitted by the light sources is diffused by the diffuser lens as the light is output. Thus, unevenness in output light is prevented. Therefore, the number of the light sources installed can be decreased, resulting in cost reduction.

(29) The light source may be an LED. In this way, high brightness and low power consumption can be achieved.

In order to solve the problem, a display device according to the present invention includes the lighting device, and a display panel configured to provide a display by utilizing the light from the lighting device.

According to the display device, cost reduction can be achieved in the lighting device supplying light to the display panel. Thus, the manufacturing cost for the display device can also be decreased.

The display panel may be a liquid crystal panel. A display device like a liquid crystal display device can be applied for various purposes, such as displays for television sets or personal computers, particularly for large-size screens.

Advantageous Effect of the Invention

According to the present invention, cost reduction and the like can be achieved.

BRIEF DESCRIPTION OF THE DRAWINGS

FIG. 1 is an exploded perspective view showing a schematic configuration of a television receiver according to the first embodiment of the present invention;

FIG. 18 is an exploded perspective view of the liquid crystal display device according to the fifth embodiment of the present invention;

BEST MODE FOR CARRYING OUT THE INVENTION

First Embodiment

Figure 2:
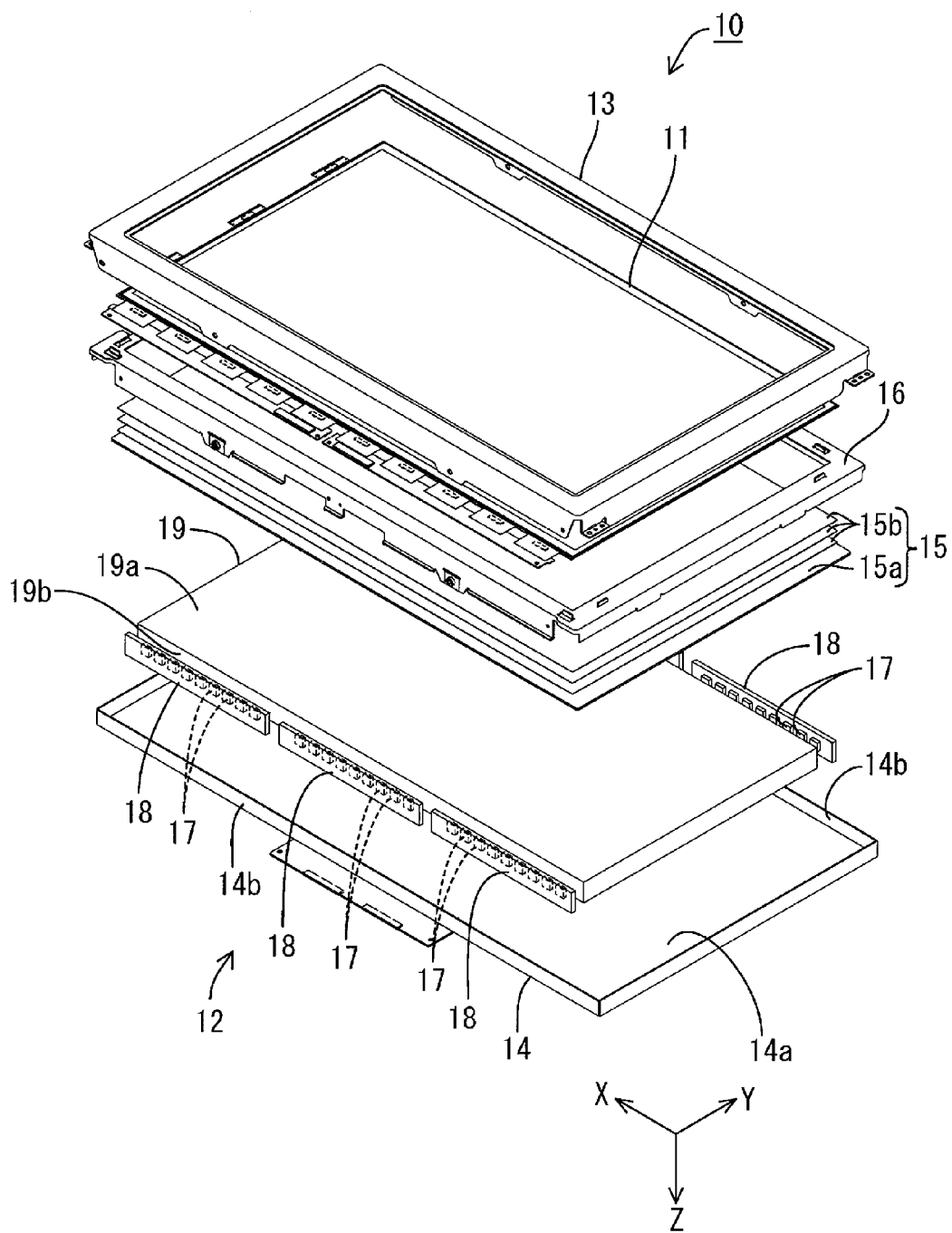
FIG. 2 is an exploded perspective view showing a schematic configuration of a liquid crystal display device of the television receiver.

A first embodiment of the present invention will be described with reference to FIGS. 1 to 9. According to the present embodiment, a liquid crystal display device 10 will be described by way of example. In some parts of the drawings, an X-axis, a Y-axis, and a Z-axis are shown, and the directions of the axes corresponding to the directions shown in the drawings. An upper side and a lower side of FIGS. 3 and 4 correspond to a front side and a back side, respectively.

As shown in FIG. 1, a television receiver TV according to the present embodiment includes the liquid crystal display device 10; front and rear cabinets Ca and Cb housing the liquid crystal display device 10 in a sandwiching manner; a power source P; a tuner T; and a stand S. The liquid crystal display device (display device) 10 has a generally horizontally long (elongated) square (rectangular) shape, and is housed in an upright manner. The liquid crystal display device 10, as shown in FIG. 2, includes a liquid crystal panel 11 as a display panel, and a backlight unit (lighting device) 12 as an external light source, which are integrally retained by a frame-like bezel 13, for example.

As shown in FIG. 2, the liquid crystal panel 11 has a horizontally long (elongated) square (rectangular) shape in plan view, and includes a pair of glass substrates affixed to each other with a predetermined gap there between, with liquid crystal enclosed between the glass substrates. One of the glass substrates has switching components (such as TFTs) connected to source wiring and gate wiring that are orthogonal to each other, pixel electrodes connected to the switching components, an alignment film, or the like. The other glass substrate has color filters including color sections of, for example, R (red), G (green), and B (blue) in predetermined arrangements, counter electrodes, an alignment film, or the like. On the outer sides of the substrates, polarizing plates are arranged.

As shown in FIG. 2, the backlight unit 12 includes a substantially box-shaped chassis 14 having an opening on a light output surface side (the side of the liquid crystal panel 11); and a group of optical members 15 (a diffuser plate (light diffusing member) 15a and a plurality of optical sheets 15b arranged between the diffuser plate 15a and the liquid crystal panel 11) arranged so as to cover the opening of the chassis 14. The chassis 14 houses LEDs 17 (Light Emitting Diodes) as a light source; LED boards 18 on which the LEDs 17 are mounted; a light guide member 19 guiding light from the LEDs 17 to the optical members 15 (liquid crystal panel 11); and a frame 16 holding the light guide member 19 from the front side. In the backlight unit 12, the LED boards 18 having the LEDs 17 are arranged on both end portions of the backlight unit 12 on the long sides thereof, and the light guide member 19 is arranged on a central side of the back light unit 12 in a sandwiching manner between both sides of the LED boards 18. Thus, the backlight unit 12 is of the so-called edge-light type (side-light type). In the following, the constituent components of the backlight unit 12 will be described in detail.

Figure 3:
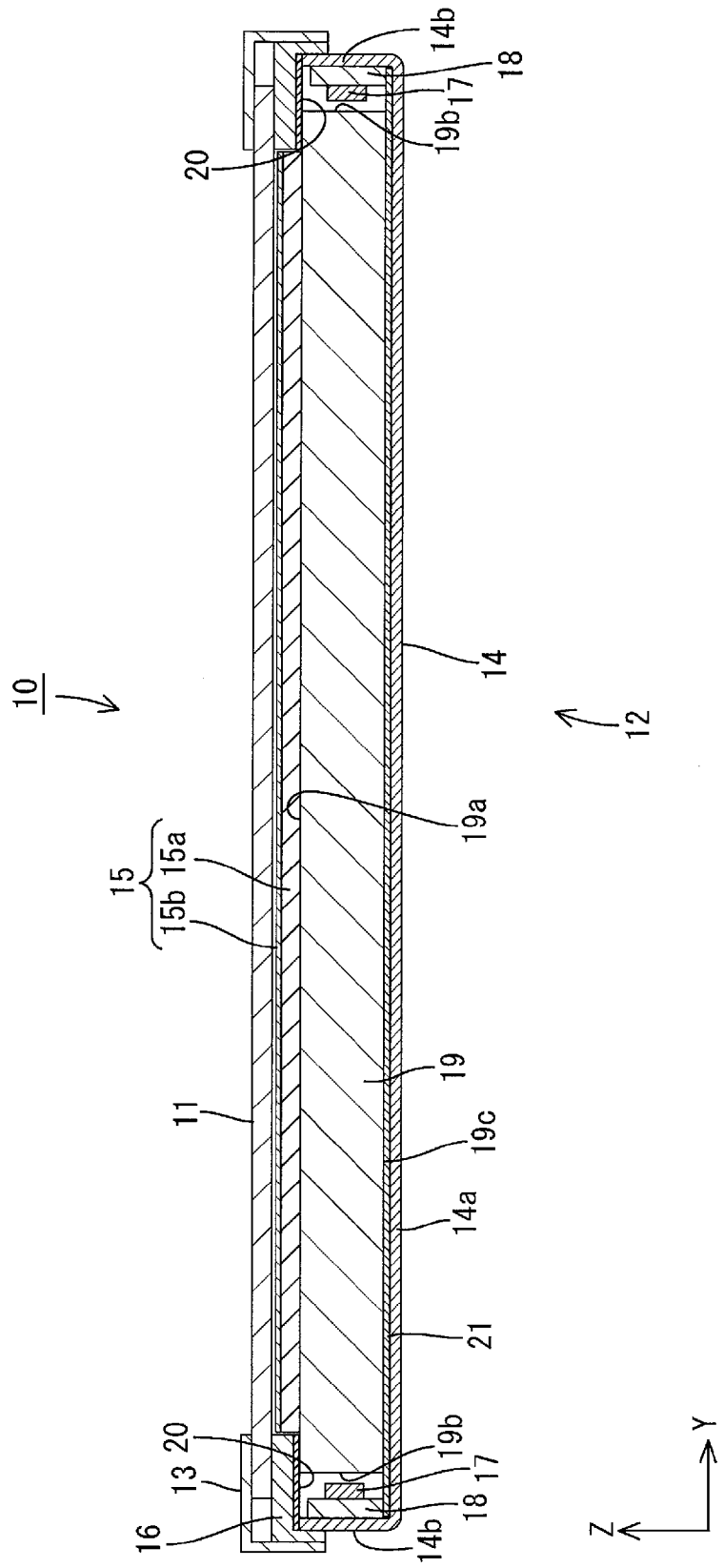
FIG. 3 is a cross section view of the liquid crystal display device taken along a short side direction thereof.

As shown in FIGS. 2 and 3, the chassis 14, which may be made of a metal, includes a bottom plate 14a with an horizontally long square shape similar to the liquid crystal panel 11, and a pair of side plates 14b rising from the outer ends of the bottom plate 14a on the long sides thereof. The chassis 14 (bottom plate 14a) has a long side direction aligned with the X-axis direction (horizontal direction) and a short side direction aligned with the Y-axis direction (vertical direction). To the side plates 14b, the frame 16 and the bezel 13 are threadably affixed.

As shown in FIG. 2, the optical members 15 have a horizontally long square shape in plan view, similar to the liquid crystal panel 11 and the chassis 14. The optical members 15 are mounted on the front side (light output side) of the light guide member 19 to be arranged between the liquid crystal panel 11 and the light guide member 19. The optical members 15 include the diffuser plate 15a arranged on the back side (the side of the light guide member 19; side opposite to the light output side), and the optical sheets 15b arranged on the front side (the side of the liquid crystal panel 11; the light output side). The diffuser plate 15a is made of a substantially transparent plate-like base substrate of a resin with a predetermined thickness in which a number of diffusing particles are dispersed. The diffuser plate 15a has the function of diffusing transmitted light. The optical sheets 15b constitute a layer formed of staked three sheets, each with a thickness smaller than the one of the diffuser plate 15a. Specific types of the optical sheets 15b may include a diffuser sheet, a lens sheet, and a reflection type polarizing sheet, from which one or more may be appropriately selected and used.

As shown in FIG. 2, the frame 16 has a frame shape (extending along outer peripheral end portions of the light guide member 19 so as to hold the substantially entire outer peripheral end portions of the light guide member 19 from the front side. The frame 16 may be made of a synthetic resin and may have a black surface to provide a light blocking property. As shown in FIG. 3, on the back side surfaces of the long side portions of the frame 16, namely on the surfaces opposed to the light guide member 19 and the LED boards 18 (and LEDs 17), first reflection sheets 20 reflecting light are mounted. The first reflection sheets 20 have a size such that they extend along substantially the entire length of the long side portions of the frame 16. The first reflection sheets 20 are directly abutted on the end portions of the light guide member 19 on the side of the LEDs 17, and cover the both end portions of the light guide member 19 and the LED boards 18 from the front side. The frame 16 is also configured to receive the outer peripheral end portions of the liquid crystal panel 11 from the back side.

As shown in FIGS. 2 and 3, the LEDs 17 include LED chips which are sealed with a resin material on board portions fixed on the LED boards 18. The LED chips mounted on the board portions may be configured to emit light of a single dominant emission wavelength, specifically the single color of blue. On the other hand, the resin material with which the LED chips are sealed may contain a dispersion of a phosphor that emits a predetermined color upon excitation by the blue light emitted by the LED chips. Therefore, the LEDs 17 can emit substantially white light as a whole. For example, the phosphor may include a yellow phosphor emitting yellow light, a green phosphor emitting green light, or a red phosphor emitting red light, either in combination or individually. The LEDs 17 are of the so-called "top type" in which the surface opposite to the mounting surface with respect to the LED boards 18 constitutes the light emitting surface.

Figure 4:
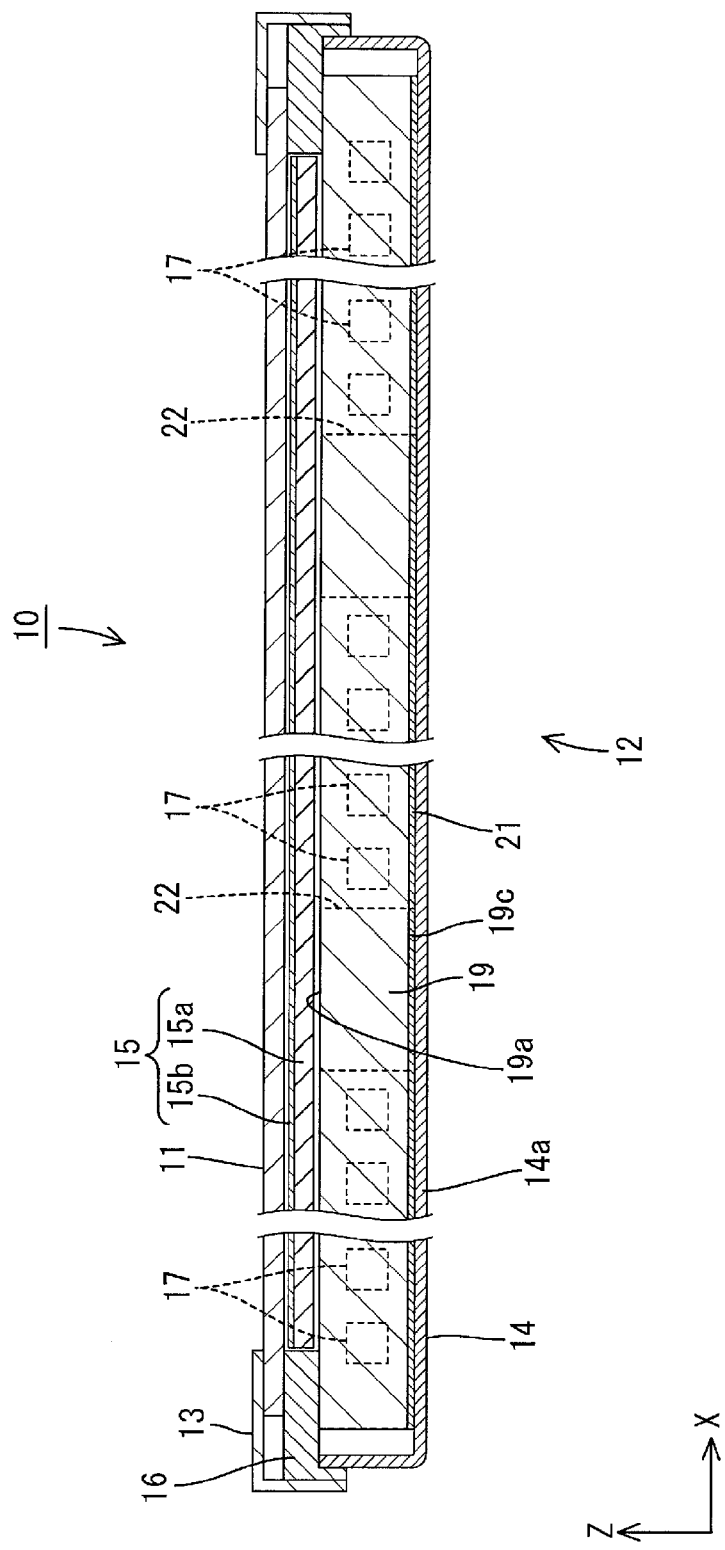
FIG. 4 is a cross section view of the liquid crystal display device taken along a long side direction thereof.
Figure 5:
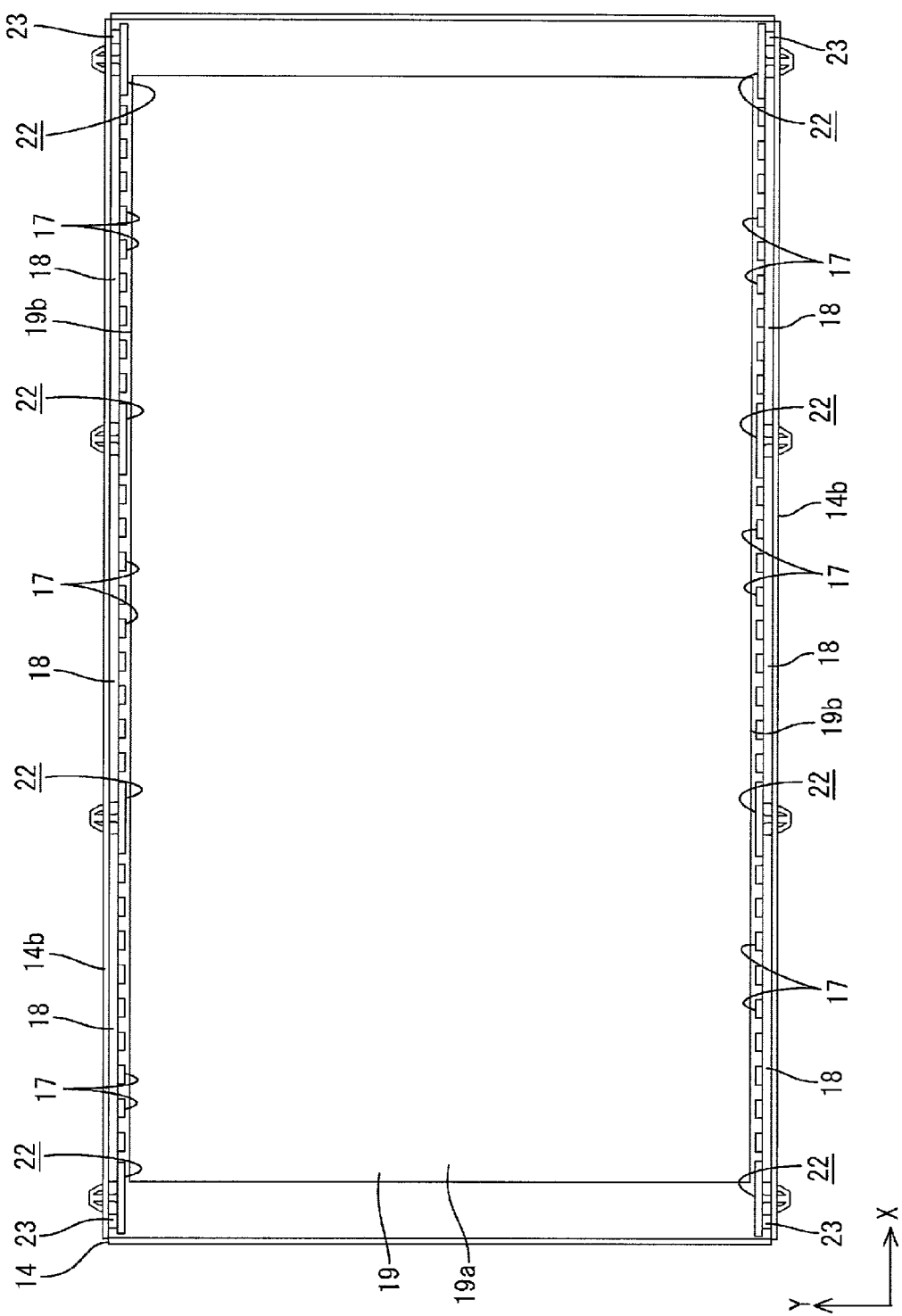
FIG. 5 is a plan view showing an arrangement configuration of a chassis, a light guide member, LED boards, and connecting and retaining members of the liquid crystal display device.

The LED boards 18 may be made of a synthetic resin (such as epoxy resin) or a ceramic material with a white surface of high optical reflecting property. As shown in FIGS. 2 to 5, the LED boards 18 have an elongated plate shape extending along the long side direction of the chassis 14 (i.e., along the end portions of the light guide member 19 on the side of the LEDs 17). The LED boards 18 are housed in the chassis 14 with their main plate surfaces parallel with the X-axis direction and the Z-axis direction, i.e., orthogonal to the plate surfaces of the liquid crystal panel 11 and the light guide member 19 (optical members 15). Thus, the LED boards 18 are arranged with the long side direction (length direction) and the short side direction (width direction) of the main plate surfaces aligned with the X-axis direction and the Z-axis direction, respectively, and with a plate thickness direction orthogonal with the main plate surfaces aligned with the Y-axis direction. The LED boards 18 are arranged at the both end portions of the chassis 14 on the long sides thereof, forming pairs. Specifically, three LED boards 18 are arranged parallel to each other along the X-axis direction at each of the end portions of the chassis 14 on the long sides thereof, namely, along the long side direction of the LED boards 18 (FIG. 5). The LED boards 18 arranged parallel to each other along the X-axis direction have a gap C between the adjacent LED boards 18 or between with external connection members 23, which will be described later (FIG. 5). The LED boards 18 are attached to the inner surfaces of the pair of side plates 14b provided at the outer edges of the chassis 14 on the long sides thereof (FIG. 3).

As shown in FIGS. 2, 3, and 5, the LED boards 18 are arranged in pairs across the light guide member 19 with respect to the Y-axis direction. Specifically, the LED boards 18 are housed in the chassis 14 from the front side along the Z-axis direction to be sandwiched between the light guide member 19 and the side plates 14b of the chassis 14. On the inner one of the main plate surfaces of the LED boards 18 that faces the light guide member 19 (the surface opposed to the light guide member 19), the LEDs 17 of the above configuration are surface-mounted, where constitutes mounting surfaces 18a. The paired LED boards 18 are housed in the chassis 14 with their mounting surfaces 18a for the LEDs 17 opposed to each other. Thus, the light emitting surfaces of the LEDs 17 mounted on the paired LED boards 18 are opposed to each other, with the optical axes of the LEDs 17 substantially aligned with the Y-axis direction. In other words, the LEDs 17 mounted on the paired LED boards 18 are opposed to the corresponding end portions of the light guide member 19. The LED boards 18 may be made of the same metal material as the chassis 14, such as an aluminum-based material, with a wiring pattern formed on the surface thereof via an insulating layer.

Figure 8:
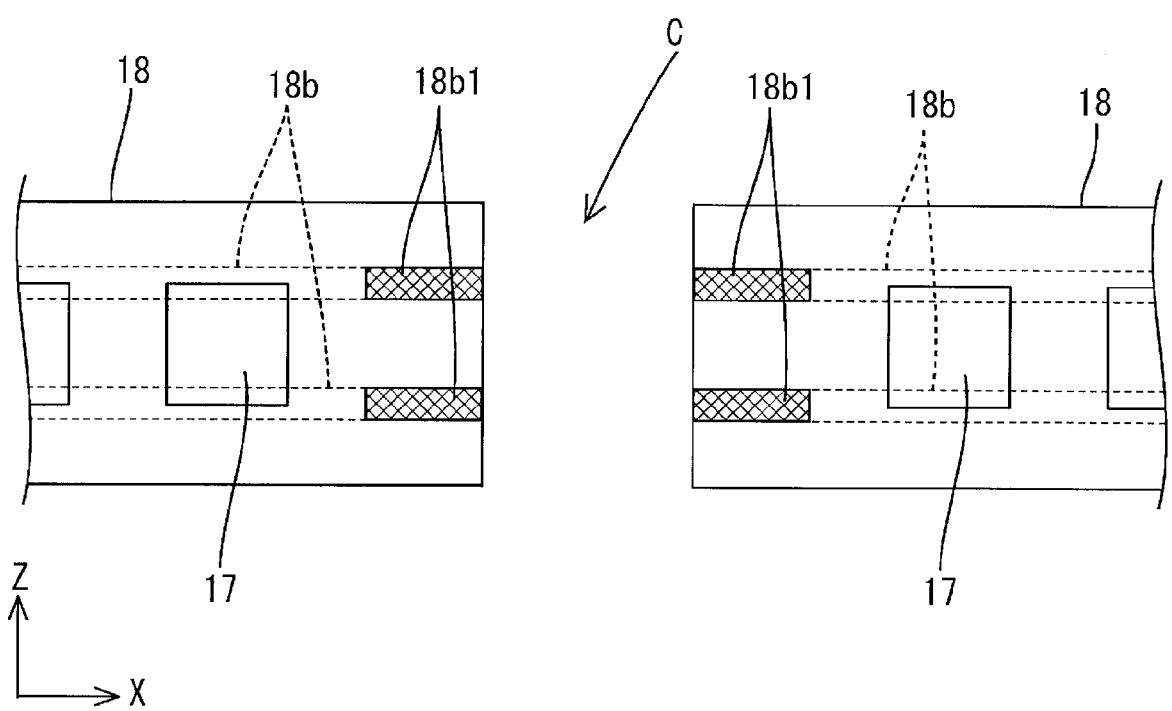
FIG. 8 is a front view of the adjacent LED boards.

As shown in FIGS. 2 and 5, a plurality (nine in FIG. 2) of LEDs 17 are arranged parallel to each other on the mounting surfaces 18a of the LED boards 18 along the long side direction thereof (X-axis direction). As shown in FIG. 8, on the LED boards 18, wiring patterns 18b made of metal films (such as copper foils) are formed. The wiring patterns 18b are arranged across the mounted LEDs 17 and connect the adjacent LEDs 17 in series. Specifically, a pair of wiring patterns 18b is arranged on the LED boards 18 with sandwiching the LEDs 17 with respect to the Y-axis direction and arranged parallel to each other along X-axis direction, to connect all of the LEDs 17 mounted on the LED boards 18. Most of the central portion of the wiring patterns 18b in the length direction thereof is covered with an insulating layer, which is not shown, to prevent exposure to the outside. However, the both end portions of the wiring patterns 18b in the length direction are not covered with the insulating layer and are exposed to the outside, which constitute a pair of terminal portions 18b1. In FIG. 8, the covered portions of the wiring patterns 18b with the insulating layer are indicated by broken lines, and the terminal portions 18b1 exposed to the outside are indicated by meshing. The wiring patterns 18b are formed on the mounting surfaces 18a for LEDs 17 of the LED boards 18. Thus, the LED boards 18 according to the present embodiment are of the one-side mounting type in which only one of the main plate surfaces provides the mounting surface.

The light guide member 19 may include a substantially transparent (i.e., highly light transmissive) synthetic resin material (such as acrylic) with a refractive index sufficiently higher than air. As shown in FIG. 2, the light guide member 19 has a plate shape which is a horizontally long square shape in plan view similar to the liquid crystal panel 11 and the chassis 14. A long side direction of the main plate surfaces thereof is aligned with the X-axis direction, a short side direction is aligned with the Y-axis direction, and a plate thickness direction orthogonal to the main plate surfaces is aligned with the Z-axis direction. As shown in FIG. 3, the light guide member 19 is arranged immediately under the liquid crystal panel 11 and the optical members 15 in the chassis 14 to be sandwiched between the paired LED boards 18 at the both end portions of the chassis 14 on the long sides thereof, with respect to the Y-axis direction. Thus, the LEDs 17 (LED boards 18) and the light guide member 19 are arranged in an arrangement direction aligned with the Y-axis direction, whereas the optical members 15 (liquid crystal panel 11) and the light guide member 19 are arranged in an arrangement direction aligned with the Z-axis direction, the both arrangement directions being orthogonal to each other. The light guide member 19 is configured to introduce light emitted from the LEDs 17 in the Y-axis direction and cause the light to be directed up toward the optical members 15 (Z-axis direction) for output while allowing the light to travel therein. The light guide member 19 is arranged at the central position of the bottom plate 14a of the chassis 14 with respect to the short side direction thereof. Thus, the light guide member 19 is supported from the back side by the central portion of the bottom plate 14a with respect to the short side direction. The light guide member 19 is formed to be slightly larger than the optical members 15, with the outer peripheral end portions thereof extending outward beyond the outer peripheral end surfaces of the optical members 15 and being held by the a frame 16 (FIG. 3).

The light guide member 19 has a substantially planar shape extending along the plate surfaces of the bottom plate 14a of the chassis 14 and the optical members 15, with main plate surfaces thereof parallel with the X-axis direction and the Y-axis direction. Of the main plate surfaces of the light guide member 19, the surface facing the front side constitutes a light output surface 19a that causes the internal light to be output toward the optical members 15 and the liquid crystal panel 11. Of the outer peripheral end surfaces of the light guide member 19 adjacent to the main plate surfaces thereof, the elongated end surfaces on the long sides of the light guide member 19 extending along the X-axis direction are opposed to the LEDs 17 (LED boards 18) via a predetermined space. Thus, the longitudinal end surfaces constitute light incident surfaces 19b on which the light emitted by the LEDs 17 is incident.

The light incident surfaces 19b are parallel with the X-axis direction and the Z-axis direction, and are substantially orthogonal to the light output surface 19a. The LEDs 17 and the light incident surfaces 19b are arranged in a direction aligned with the Y-axis direction and parallel with the light output surface 19a. A surface 19c of the light guide member 19 opposite to the light output surface 19a is entirely covered with a second reflection sheet 21 configured to reflect the light in the light guide member 19 up toward the front side. The second reflection sheet 21 extends to areas overlapping with the LED boards 18 (LEDs 17) in plan view. Accordingly, the LED boards 18 (LEDs 17), together with the space between the LED boards 18 and the light incident surfaces 19b, are sandwiched between the first reflection sheets 20 on the front side and the second reflection sheet 21. Thus, the light from the LEDs 17 is repeatedly reflected between the reflection sheets 20 and 21 such that the light is incident on the light incident surfaces 19b efficiently. At least one of the light output surface 19a and the opposite surface 19c thereof may be patterned with a reflecting portion (not shown) reflecting the internal light or a diffusing portion (not shown) diffusing the internal light, to have a predetermined in-plane distribution. Therefore, the in-plane distribution of the output light from the light output surface 19a can be controlled to be uniform.

As shown in FIG. 5, the backlight unit 12 according to the present embodiment includes connecting and retaining members 22 for electrically mutually connecting the three LED boards 18 arranged parallel to each other along the X-axis direction and also mechanically retaining the LED boards 18 with respect to the chassis 14. Specifically, of the three LED boards 18 arranged parallel to each other along the X-axis direction, the adjacent ones are connected to each other by the connecting and retaining members 22, and the ones at the ends in the X-axis direction are connected to the external connection members 23 adjacently arranged thereto by the connecting and retaining members 22. The external connection members 23 are connected to a power supply board (not shown) provided outside the chassis 14 to supply drive power therefrom to the LEDs 17 on the LED boards 18. The external connection members 23 are arranged adjacent to and further outside from the LED boards 18 positioned at the ends with respect to the X-axis direction. The external connection members 23 have exposed terminal portions (not shown) on a surface opposed to the connecting and retaining members 22, similar to the LED boards 18. The connecting and retaining members 22 are arranged intermittently at intervals approximately corresponding to the long side dimension of the LED boards 18 along the X-axis direction, four on each of the end portions of the chassis 14 on the long sides. Each of the connecting and retaining members 22 mechanically retains two adjacent LED boards 18 or the LED board 18 and its adjacent external connection member 23 by sandwiching them with the side plates 14 of the chassis 14 on the long sides. In the following, a configuration of the connecting and retaining members 22 will be described in detail.

Figure 6:
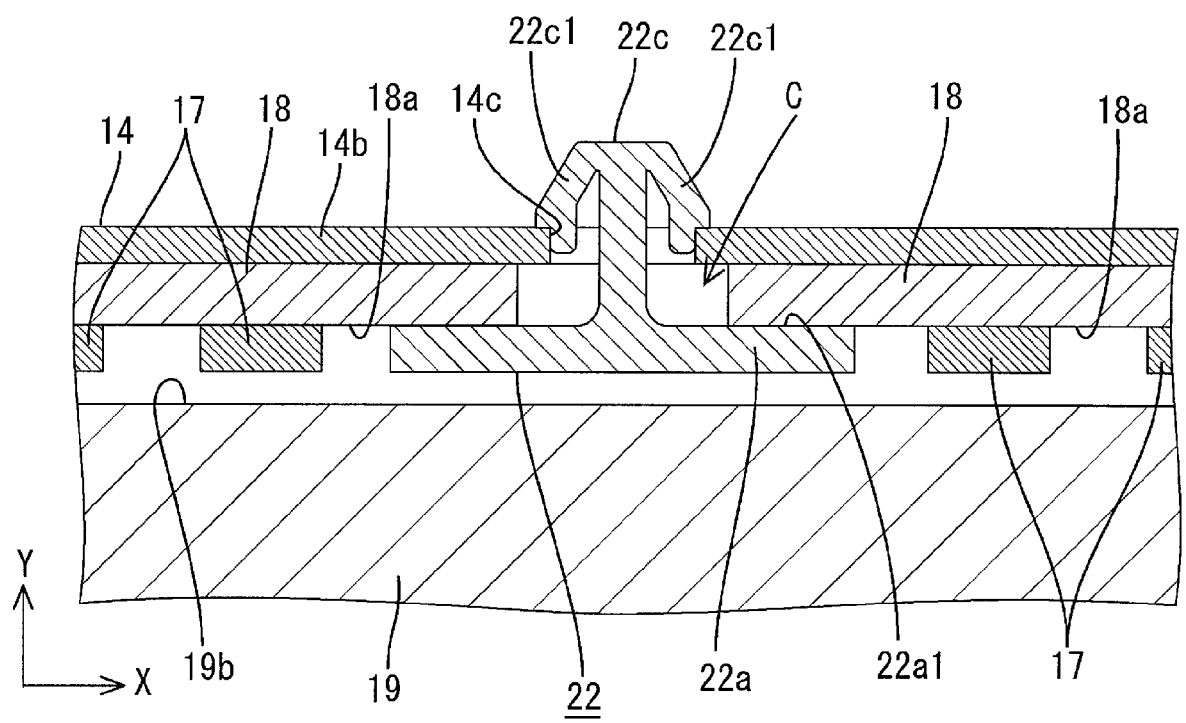
FIG. 6 is an enlarged planar cross section view of a main portion showing the adjacent LED boards and the connecting and retaining member connected to each other.
Figure 7:
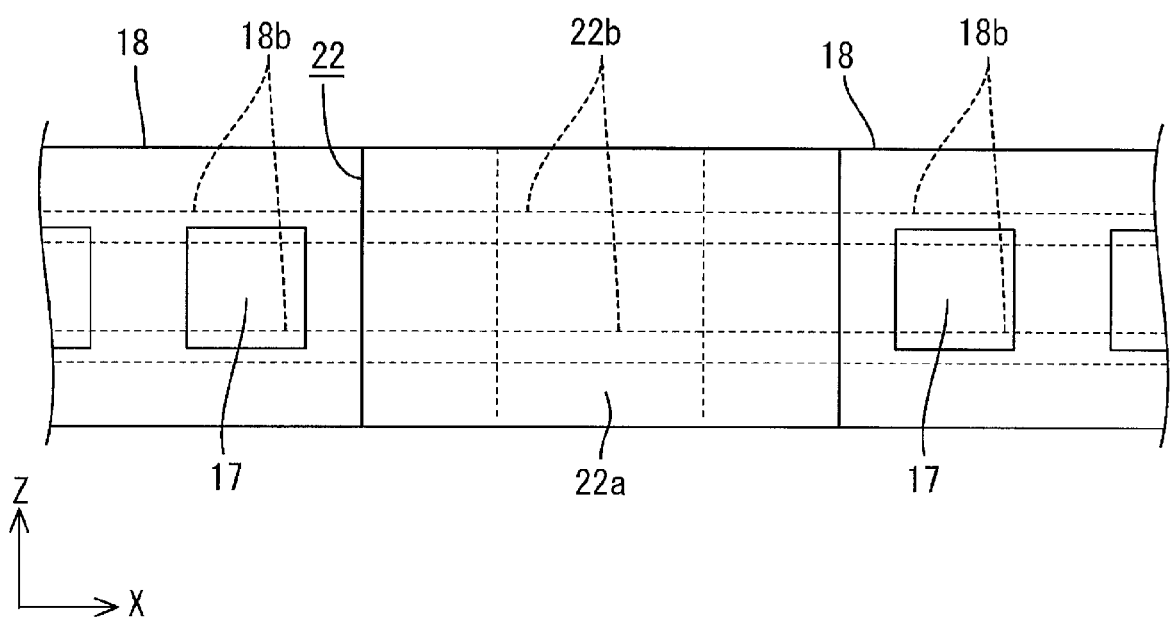
FIG. 7 is a front view showing the adjacent LED boards and the connecting and retaining member connected to each other.
Figure 9:
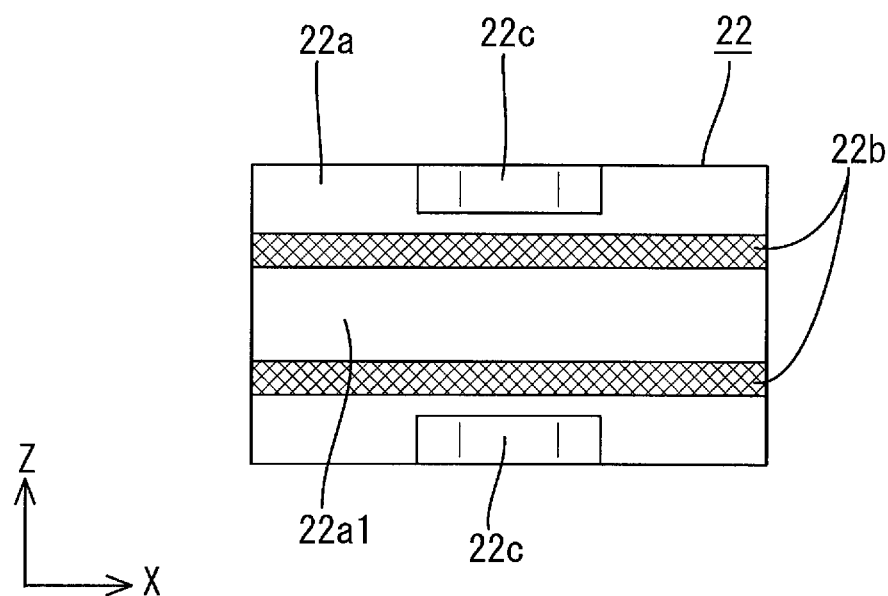
FIG. 9 is a rear view of the connecting and retaining member.

As shown in FIGS. 6, 7, and 9, the connecting and retaining members 22, which may be made of a synthetic resin with a white surface of high optical reflectivity, include: a main body portion 22a having a plate shape; wiring portions 22b formed on a surface 22a1 of the main body portion 22a on the side of the side plates 14b (opposite to the side of the light guide member 19) which is opposed to the LED boards 18; and a fixing portion 22c projecting from the main body portion 22a toward the side plates 14b. The connecting and retaining members 22 have a rotationally symmetric shape as a whole and have 2-fold symmetry.

The main body portion 22a has an elongated plate shape with a long side direction (length direction), a short side direction (width direction), and a plate thickness direction each aligned with the corresponding direction of the LED boards 18. The main body portion 22a is arranged in the chassis 14 with its main plate surfaces parallel with the main plate surfaces of the LED boards 18 (i.e., parallel with the X-axis direction and the Z-axis direction). As shown in FIGS. 5 and 6, the long side dimension (length dimension) of the main body portion 22a is larger than the interval between the adjacent LED boards 18 or the interval between the LED boards 18 and the adjacent external connection members 23 with respect to the X-axis direction. Thus, when the two adjacent LED boards 18 or the LED board 18 and its adjacent external connection member 23 are sandwiched between the main body portion 22a and the side plate 14b of the chassis 14, the both end portions of the main body portion 22a in the long side direction overlap with the two adjacent LED boards 18 or the LED board 18 and its adjacent external connection member 23. The main body portion 22a has a substantially equal overlapping area with respect to the two adjacent LED boards 18 or the LED board 18 and its adjacent external connection member 23. In this attached state, the main body portion 22a is configured to hold the mounting surface 18a of the LED boards 18 or the inward-facing surface of the external connection member 23 from the inside of the chassis 14 (i.e., from the side of the light guide member 19). Thus, the both end portions of the LED boards 18 in the long side direction thereof (the terminal portions 18b1) are held by the main body portions 22a of the different connecting and retaining members 22. On the other hand, the short side dimension (width dimension) of the main body portion 22a is substantially equal to the corresponding dimension of the LED boards 18 and the external connection members 23, as shown in FIG. 7. Thus, in the attached state, the both outer edges of the main body portion 22a in the short side direction (Z-axis direction) and the both outer edges of the LED boards 18 in the short side direction are flush with each other such that the adjacent outer edges form a straight line along the X-axis direction with no step.

As shown in FIG. 9, the wiring portions 22b, which may be made of metal films (such as copper foils), are formed on the opposed surface 22a1 of the main body portion 22a opposed to the mounting surfaces 18a of the LED boards 18 in such a manner as to traverse the main body portion 22a along the long side direction (X-axis direction; the length direction of the wiring patterns 18b). Specifically, a pair of wiring portions 22b, with a predetermined line width, linearly extends the entire length of the main body portion 22a along the X-axis direction, parallel to each other at a predetermined interval in the short side direction (Z-axis direction) of the main body portion 22a. The pair of wiring portions 22b has the line width and the interval in the Z-axis direction are substantially the same as those of the pair of wiring patterns 18b formed on the LED boards 18 (FIG. 7). The wiring portions 22b are exposed to the outside along their entire length and areas. Thus, when the two adjacent LED boards 18 or the LED board 18 and its adjacent external connection member 23 are sandwiched between the main body portion 22a and the side plates 14b of the chassis 14, the wiring portions 22b are abutted on and electrically connected with the terminal portions 18b1 of the LED boards 18 or the terminal portions of the external connection members 23. At this time, even when the connecting and retaining members 22 are relatively displaced with respect to the LED boards 18 or the external connection members 23 to some extent, the wiring portions 22b exposed over their entire length and area are reliably abutted on the terminal portions 18b1. In FIG. 9, the exposed portion of the wiring portions 22b (over entire areas) is indicated by meshing.

As shown in FIG. 6, the fixing portion 22c projects from the opposed surface 22a1 of the main body portion 22a opposed to the LED boards 18, i.e., from the surface on which the wiring portions 22b are formed, toward the side plates 14b of the chassis 14. On the projected end, a pair of locking parts 22c1 is formed in bent shape toward the opposed surface 22a1 of the main body portion 22a. The side plates 14b of the chassis 14 has attaching holes 14c formed therethrough at positions where the connecting and retaining members 22 are to be attached. Therefore, the fixing portion 22c is inserted into the attaching hole 14c with the locking parts 22c1 thereof locked on the edge of the attaching hole 14c. In this way, the connecting and retaining members 22 can be fixed on the chassis 14 in an attached state. The fixing portion 22c is formed at the substantially central position of the main body portion 22a in the long side direction where the fixing portion 22c does not overlap with the LED boards 18 or the external connection members 23 in the attached state (non-overlapping portion). Thus, in the attached state, the fixing portion 22c is positioned in the gap C between the two adjacent LED boards 18 or the LED board 18 and its adjacent external connection member 23. In other words, the gap C is divided by the fixing portion 22c into two areas on the side of each of the two adjacent LED boards 18 (i.e., toward the left and right of FIG. 6). As shown in FIG. 9, a pair of the fixing portions 22c is respectively provided at the both outer edge portions of the main body portion 22a with respect to the short side direction, i.e., across the wiring portions 22b. Therefore, the attached state can be stabilized.

Next, the operation of the above structure according to the present embodiment will be described. When the liquid crystal display device 10 is manufactured, the liquid crystal panel 11, the backlight unit 12, the bezel 13, and others that have been separately manufactured may be assembled. In the following, a procedure for manufacturing the liquid crystal display device 10 will be described.

First, the LED boards 18 and the external connection members 23, which are positioned with respect to each other, are housed in the chassis 14 with attached to the inner surface of the side plates 14b on the long sides (see FIG. 6). In this state, the connecting and retaining members 22 are attached to the side plates 14b from the inside of the chassis 14. Specifically, the connecting and retaining members 22 are pushed toward the side plates 14b while adjusting the position of the main body portion 22a to straddle the two adjacent LED boards 18 or the LED board 18 and its adjacent external connection member 23, whereby the fixing portions 22c can be inserted into the attaching holes 14c of the side plates 14b through the Gap C. When the attached state is established, as shown in FIG. 6, the locking parts 22c1 of the fixing portion 22c are locked on the edges of the attaching holes 14c from the outside, whereby the connecting and retaining members 22 are fixed on the chassis 14 in the attached state, while the two adjacent LED boards 18 or the LED board 18 and its adjacent external connection member 23 are sandwiched between the main body portion 22a and the side plates 14b to be mechanically retained. In the attached state, as shown in FIG. 7, the wiring portions 22b of the connecting and retaining members 22 (FIG. 9) are abutted on (or contacted with) the terminal portions 18b1 of the two adjacent LED boards 18 (FIG. 8) or the terminal portion 18b1 of the LED board 18 and its adjacent external connection member 23. Thus, the two adjacent LED boards 18 or the LED board 18 and its adjacent external connection member 23 are mutually electrically connected to each other. In other words, by attaching the connecting and retaining members 22, both mechanical retention and electrical connection can be established between the two adjacent LED boards 18 or between the LED board 18 and its adjacent external connection member 23, thus providing excellent workability. When attachment of the connecting and retaining members 22 is completed, as shown in FIG. 5, adjacent ones of the three LED boards 18 arranged parallel to each other on the side plates 14b of the chassis 14 in the X-axis direction and the two external connection members 23 arranged outside the LED boards 18 in the X-axis direction are mutually electrically connected. Thus, drive power can be supplied to the LEDs 17 on the LED boards 18 from the external power supply board provided outside the chassis 14.

During the above attaching operation, even if a relative displacement with respect to the X-axis direction occurs between the connecting and retaining members 22 and the LED boards 18 or the external connection members 23 to be connected, the wiring portions 22b can be reliably abutted on the terminal portions 18b1 of the LED boards 18 or the external connection members 23 because of the wiring portions 22b of the connecting and retaining members 22, which extend the entire length of the main body portion 22a and are exposed to the outside in their entire areas. Thus, excellent electrical connection reliability can be obtained. Further, the connecting and retaining members 22 have substantially the same overlapping areas with respect to the two adjacent LED boards 18 or the LED board 18 and its adjacent external connection member 23. Thus, substantially the same retaining force can be imparted to the LED boards 18 or the external connection members 23 to be retained, thereby providing more stable retention. Furthermore, the connecting and retaining members 22 have a rotationally symmetric shape of two-fold symmetry. Thus, the connecting and retaining members 22 may have two attaching postures different by 180°, and be attached in either posture as long as the long side direction (short side direction) of the main body portion 22a is aligned with the X-axis direction (Z-axis direction) when attached to the side plates 14b. Therefore, more excellent workability is obtained.

Thereafter, the light guide member 19 with the second reflection sheet 21 attached thereto is housed in the chassis 14, and fixed on the chassis 14 while being positioned to have substantially the same interval between the light incident surfaces 19b thereof and the opposed LEDs 17. Then, the frame 16 is fitted to retain the light guide member 19 from the front side, and the optical members 15 are placed on the light guide member 19, followed by assembling the liquid crystal panel 11 and the bezel 13 successively. In this way, the liquid crystal display device 10 shown in FIGS. 3 and 4 is obtained.

When the liquid crystal display device 10 thus manufactured is turned on, the driving of the liquid crystal panel 11 is controlled by a control circuit which is not shown. In addition, the drive power is supplied from the power supply board to the LEDs 17 on the LED boards 18 via the connecting and retaining members 22 and the external connection members 23 to control the LEDs 17. The light from the LEDs 17 is guided by the light guide member 19 to be radiated onto the liquid crystal panel 11. Accordingly, a predetermined image is displayed on the liquid crystal panel 11. In the following, the operation of the backlight unit 12 will be described in detail. When the LEDs 17 are turned on, the light emitted from the LEDs 17 is incident on the light incident surfaces 19b of the light guide member 19, as shown in FIG. 3. Although there is the predetermined space between the LEDs 17 and the light incident surfaces 19b, the space is optically closed by the first reflection sheets 20 on the front side and the second reflection sheets 21 on the back side. Thus, the light from the LEDs 17 is repeatedly reflected by the reflection sheets 20 and 21. Accordingly, the light can be efficiently incident on the light incident surfaces 19b with almost no leakage to the outside. In addition, the connecting and retaining members 22, the LED boards 18, and the external connection members 23 all have a white surface with high optical reflectivity. Therefore, the light from the LEDs 17 can be efficiently reflected to be incident on the light incident surfaces 19b, thereby providing high brightness. Furthermore, as shown in FIG. 7, the connecting and retaining members 22 have a short side dimension substantially equal to the short side dimension of the LED boards 18. Accordingly, their outer edges flush with each other with no step in the short side direction. Thus, dark areas due to steps are not likely to occur, which helps to prevent uneven brightness.

When the liquid crystal display device 10 is used as described above, the LEDs 17 of the backlight unit 12 are turned on or off. As a result, the internal temperature environment may be changed, possibly resulting in thermal expansion or thermal contraction of the constituent components of the liquid crystal display device 10. Among others, the LED boards 18 with the LEDs 17 mounted tend to have high temperature due to the heat generated by the LEDs 17 and are subjected to large temperature variations, resulting in large amounts of thermal expansion or thermal contraction caused by the temperature variations. Particularly, according to the present embodiment, the LED boards 18 have an elongated shape. Therefore, the amount of expansion or contraction of the LED boards 18 in the long side direction is larger than the one in the short side direction thereof. When the LED boards 18 are deformed by warping with respect to the long side direction thereof due to thermal expansion or thermal contraction, the interval between the mounted LEDs 17 and the light incident surfaces 19b of the light guide member 19 is varied, resulting in variations in the light incidence efficiency from the LEDs 17 on the light incident surfaces 19b. Consequently, uneven brightness may occur in the output light. In this respect, according to the present embodiment, three separate LED boards 18 are opposed to each of the light incident surfaces 19b of the light guide member 19, and are arranged parallel to each other along the X-axis direction with the gap C provided between adjacent LED boards 18. Thus, even when the LED boards 18 are subjected to thermal expansion or thermal contraction, expansion or contraction of the LED boards 18 in the long side direction is acceptable by the gap C. Therefore, the warping deformation is not likely to occur. In addition, since the connecting and retaining members 22 retaining the adjacent LED boards 18 include the fixing portion 22c between the adjacent LED boards 18, the stress due to the fixing of the connecting and retaining members 22 is prevented from directly acting on the adjacent LED boards 18. Thus, the LED boards 18 are not readily constrained by the stress to have a higher degree of expanding or contracting freedom, which makes warping deformation more difficult to occur. Accordingly, the interval between the LEDs 17 mounted on the LED boards 18 and the light incident surface 19 can be maintained constant, and the light incidence efficiency on the light incident surface 19 can be stably maintained. As a result, uneven brightness prevented in the output light from the backlight unit 12 to increase the display quality of the image displayed on the liquid crystal display device 10.

As described above, the backlight unit 12 according to the present embodiment includes: the LEDs 17 as a plurality of light sources; the at least two LED boards 18 on which the LEDs 17 are mounted; and the chassis 14 in which the at least two LED boards 18 are housed. The at least two LED boards 18 include those arranged adjacent to each other. The backlight unit 12 further includes the connecting and retaining members 22 that retain the adjacent LED boards 18 on the chassis 14 while electrically connecting the adjacent LED boards 18.

In this way, the adjacent LED boards 18 of the at least two LED boards 18 are mutually electrically connected and also retained on the chassis 14 by the connecting and retaining members 22. Thus, the connecting and retaining members 22 according to the present embodiment have both of the connecting function of electrically connecting the adjacent LED boards 18 and the retaining function of retaining the adjacent LED boards 18. Accordingly, the number of components and the assembly steps is reduced than the configuration of separately including retaining members retaining the LED boards 18 individually and connecting members electrically connecting the adjacent LED boards 18. Thus, cost reduction can be achieved.

According to the present embodiment, at least two LED boards 18 are provided, of which the adjacent ones are electrically connected by the connecting and retaining members 22. Thus, the number of LED boards 18 can be easily increased and the size of the backlight unit 12 can be suitably increased. Further, depending on the arrangement of the adjacent LED boards 18, expansion or contraction of the LED boards 18 accompanying their thermal expansion or thermal contraction is acceptable.

The adjacent LED boards 18 have the gap C there between. In this way, even when the LED boards 18 are subjected to thermal expansion or thermal contraction, the expansion or contraction of the LED boards 18 is acceptable by the gap C provided between the adjacent LED boards 18. Thus, the problem of deformation such as warping of the LED boards 18 due to thermal expansion or thermal contraction can be avoided.

The at least two LED boards 18 have an elongated shape and are arranged parallel to each other along their long side direction. The longitudinal LED boards 18 are subjected to greater expansion or contraction with respect to the long side direction than the short side direction at the time of thermal expansion or thermal contraction. Thus, by providing the gap C between the LED boards 18 arranged along the long side direction, expansion or contraction of the LED boards 18 in the long side direction due to thermal expansion or thermal contraction is suitably accepted, thus effectively preventing the deformation of the LED boards 18. Further, the size of the backlight unit 12 can be more suitably increased.

A plurality of the LEDs 17 are arranged on the at least two LED boards 18 parallel to each other along the long side direction thereof. In this way, the plurality of LEDs 17 can be efficiently arranged on the LED boards 18. Therefore, high brightness can be suitably obtained, for example.

The connecting and retaining members 22 include the fixing portion 22c to be fixed on the chassis 14 and arranged between the adjacent LED boards 18. In this way, because the fixing portion 22c to be fixed on the chassis 14 is arranged between the adjacent LED boards 18, the stress associated with the fixing can be prevented from directly acting on the LED boards 18. Thus, the expansion or contraction of the LED boards 18 due to thermal expansion or thermal contraction is suitably accepted.

The connecting and retaining members 22 are configured to sandwich the adjacent LED boards 18 with the chassis 14. In this way, by sandwiching the adjacent LED boards 18 between the chassis 14 and the connecting and retaining members 22, the retained state and the connected state can be stably maintained.

The connecting and retaining members 22 have substantially the same overlapping areas with respect to the adjacent LED boards 18. In this way, the connecting and retaining members 22 can impart substantially the same retaining force to the adjacent LED boards 18. Therefore, the retained state and the connected state can be more stably maintained.

On the mounting surfaces 18a for the LEDs 17 of the adjacent LED boards 18, the wiring patterns 18b connected to the LEDs 17 are formed, whereas on the opposed surface 22a1 of the connecting and retaining members 22 opposed to the adjacent LED boards 18, the wiring portions 22b to be abutted on the wiring patterns 18b are formed. In this way, when the LED boards 18 are sandwiched between the connecting and retaining members 22 and the chassis 14, the wiring portions 22b of the connecting and retaining members 22 are abutted on the wiring patterns 18b of the LED boards 18, to electrically connect the adjacent LED boards 18. Because the LED boards 18 having the wiring patterns 18b formed on the mounting surfaces 18a for the LEDs 17 are used, the cost of the LED boards 18 can be reduced compared to the case where the wiring patterns are formed on the surface opposite to the mounting surfaces 18a for the LEDs 17.

The entire areas of the wiring portions 22b are exposed toward the adjacent LED boards 18. In this way, even if a little displacement occurs in the attached position of the connecting and retaining members 22 with respect to the LED boards 18, the wiring portions 22b, being entirely exposed toward the LED boards 18, can be reliably abutted on the wiring patterns 18b. Thus, excellent connection reliability can be obtained.

The portions (terminal portions 18b1) of the wiring patterns 18b to be abutted on the wiring portions 22b are arranged at the end portions of the adjacent LED boards 18. In this way, by sandwiching the end portions of the LED boards 18 between the connecting and retaining members 22 and the chassis 14, the wiring portions 22b are abutted on the wiring patterns 18b while the adjacent LED boards 18 are retained.

The connecting and retaining members 22 have a white surface. In this way, the light from the LEDs 17 can be efficiently reflected by the surface of the connecting and retaining members 22. Therefore, the light use efficiency can be improved.

The at least two LED boards 18 have an elongated shape and arranged parallel to each other along the long side direction thereof. The connecting and retaining members 22 have substantially the same width dimension as the short side dimension of the LED boards 18. In this way, the outer edges of the LED boards 18 in the short side direction thereof and the outer edges of the connecting and retaining members 22 in the width direction thereof are flush with each other. Thus, the adjacent LED boards 18 and the connecting and retaining members 22 have no step there between. Thus, the dark areas due to steps are not likely to occur. Accordingly, uneven brightness can be suitably prevented.

The connecting and retaining members 22 have a rotationally symmetric shape of two-fold symmetry. In this way, excellent workability can be obtained when attaching the connecting and retaining members 22 to the adjacent LED boards 18.

The at least two LED boards 18 have a white surface. In this way, the light from the LEDs 17 can be efficiently reflected by the surface of the LED boards 18. Therefore, the light use efficiency can be improved.

The light guide member 19 includes the end portions opposed to the LEDs 17 on the at least two LED boards 18. In this way, when the adjacent LED boards 18 are retained by the connecting and retaining members 22 with respect to the chassis 14, the light from the LEDs 17 can be incident on the end portions of the light guide member 19 in an excellent manner. In addition, depending on the arrangement of the adjacent LED boards 18, expansion or contraction of the LED boards 18 due to thermal expansion or thermal contraction is acceptable. Therefore, deformation of the LED boards 18 such as warping is not likely to occur. Accordingly, a constant positional relationship can be maintained between the light guide member 19 and the LEDs 17, thereby stabilizing the light incidence efficiency from the LEDs 17 on the light guide member 19.

The chassis 14 includes the bottom plate 14a supporting the light guide member 19, and the side plates 14b rising from the bottom plate 14a and sandwiching the adjacent LED boards 18 with the connecting and retaining members 22. In this way, the adjacent LED boards 18 are sandwiched between the side plates 14b rising from the bottom plate 14a of the chassis 14 and the connecting and retaining members 22. Therefore, the retained state and the connected state can be stably maintained.

The LEDs 17 are opposed to the end portions of the light guide member 19 with a space there between, with the space sandwiched between a pair of reflection sheets 20 and 21. In this way, the light from the LEDs 17 can be repeatedly reflected by the pair of reflection sheets 20 and 21 in the space provided between the LEDs 17 and the opposed end portions of the light guide member 19. Thus, the light can be efficiently incident on the end portions of the light guide member 19. Accordingly, the light use efficiency can be improved.

The light source is constituted by the LED 17. In this way, high brightness and low power consumption can be achieved.

Second Embodiment

A second embodiment of the present invention will be described with reference to FIG. 10. According to the second embodiment, connecting and retaining members 122 have a modified shape from the first embodiment. Redundant description of structures, operations, and effects similar to those of the first embodiment will be omitted.

Figure 10:
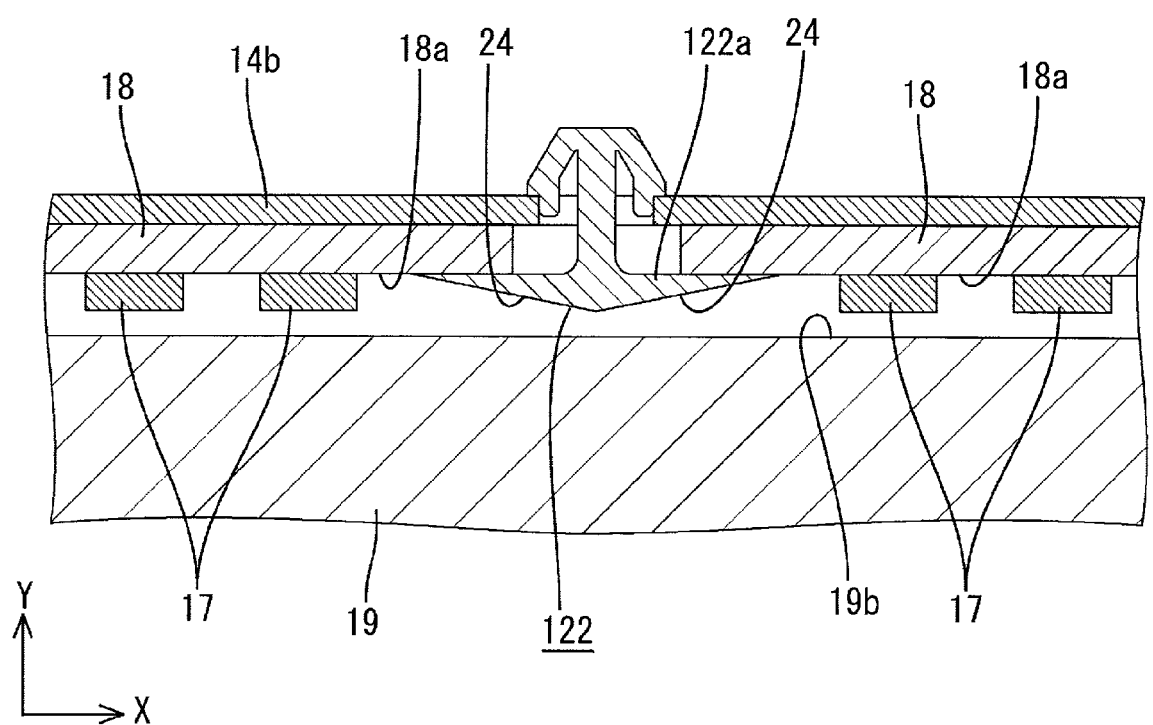
FIG. 10 is an enlarged planar cross section view of a main portion showing the adjacent LED boards and the connecting and retaining member connected to each other according to the second embodiment of the present invention.

As shown in FIG. 10, the connecting and retaining members 122 according to the present embodiment include a main body portion 122a which is formed in a mountain shape spreading out toward the mounting surfaces 18a of the LED boards 18 sandwiched between the connecting and retaining members 122 and the side plates 14b (i.e., in a direction away from the light guide member 19). Specifically, the main body portion 122a has a substantially isosceles triangular cross section along the long side direction (X-axis direction) with a pair of inclined surfaces 24 on the side opposite to the LED boards 18 (i.e., on the side of the light incident surfaces 19b of the light guide member 19). The inclined surfaces 24 of the main body portion 122a are continuous with the mounting surfaces 18a of the LED boards 18 with virtually no step. Thus, the dark areas due to steps can be prevented. In this way, uneven brightness is not likely to occur. Further, the light from the LEDs 17 can be angled by the inclined surfaces 24 as it is reflected toward the light incident surfaces 19b. Therefore, the light use efficiency can be improved.

As described above, according to the present embodiment, the connecting and retaining members 122 are formed in a mountain shape spreading out toward the mounting surfaces 18a of the adjacent LED boards 18. In this way, steps are not likely to occur between the surface of the connecting and retaining members 122 and the mounting surfaces 18a for the LEDs 17 of the LED boards 18, thereby preventing the dark areas due to steps. Thus, uneven brightness can be prevented.

The connecting and retaining members 122 have the inclined surfaces 24. In this way, the light from the LEDs 17 can be reflected at an angle by the inclined surfaces 24.

Third Embodiment

A third embodiment of the present invention will be described with reference to FIGS. 11 to 14. According to the third embodiment, LED boards 218 and connecting and retaining members 222 have structures modified from the first embodiment. Redundant description of structures, operations, and effects similar to those of the first embodiment will be omitted.

Figure 11:
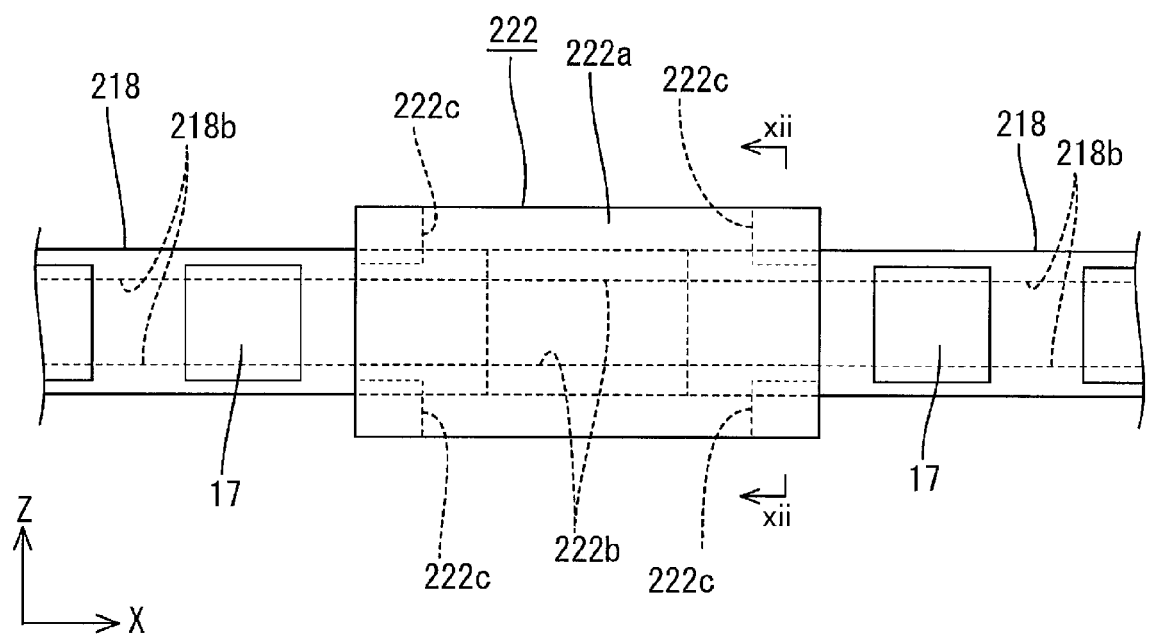
FIG. 11 is a front view showing the adjacent LED boards and the connecting and retaining member connected to each other according to the third embodiment of the present invention.
Figure 12:
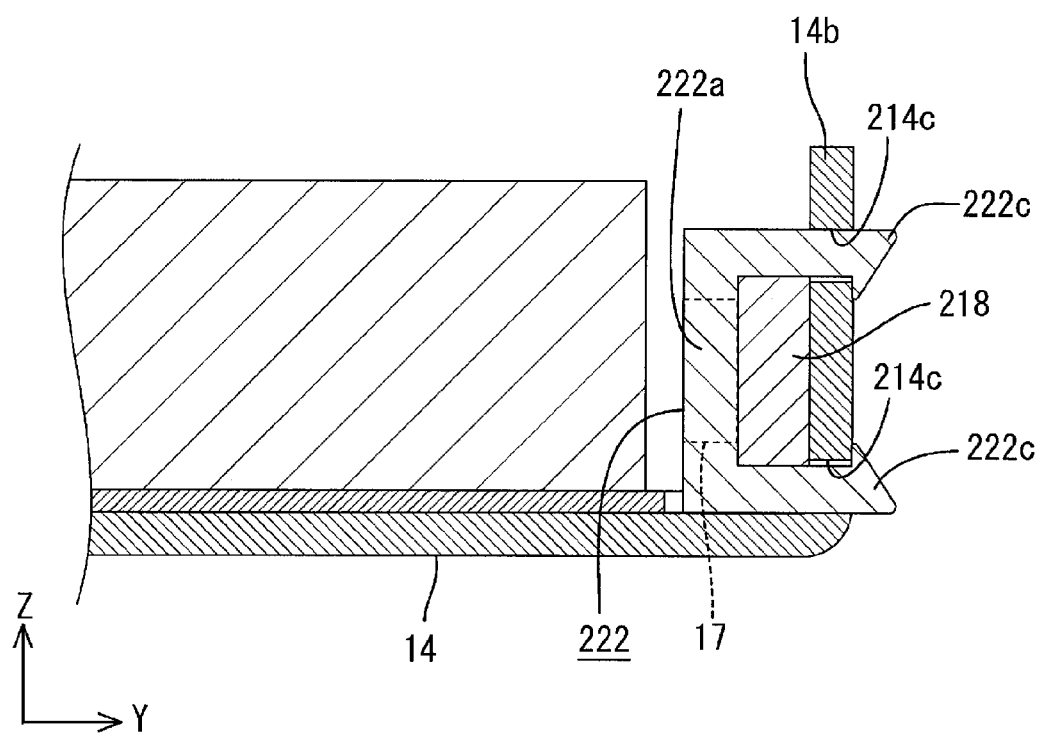
FIG. 12 is a cross section view taken along a line xii-xii of FIG. 11.
Figure 13:
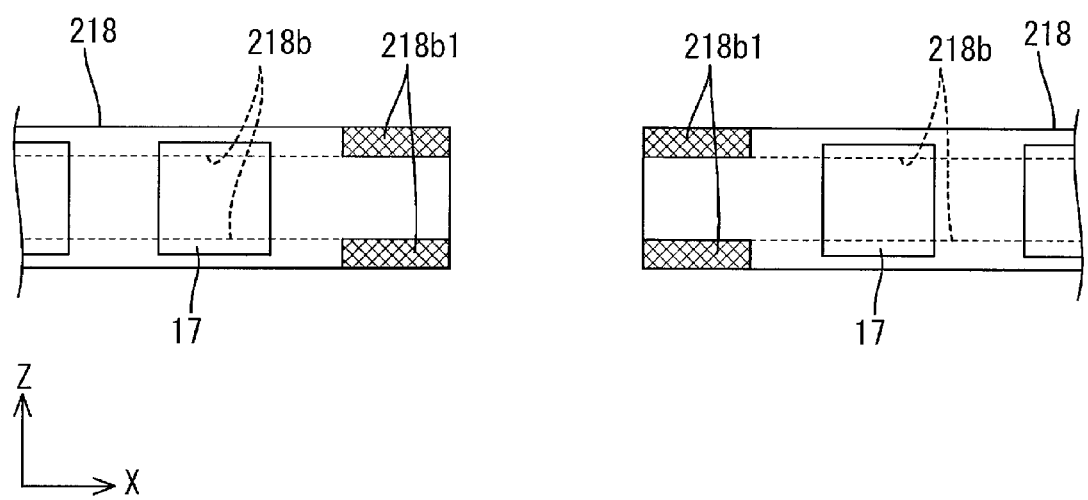
FIG. 13 is a front view of the adjacent LED boards.
Figure 14:
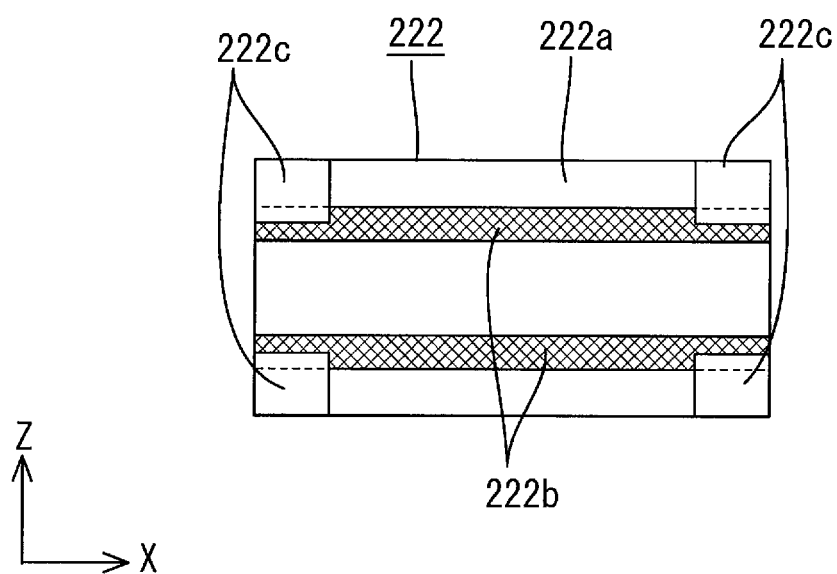
FIG. 14 is a rear view of the connecting and retaining member.

As shown in FIGS. 11 to 13, the LED boards 218 have a relatively small short side dimension (width dimension) compared to the LED boards according to the first embodiment. The LED boards 218 include amounting surface 218a on which a pair of wiring patterns 218b is formed. The pair of wiring patterns 218b is arranged at the both outer edge portions of the LED boards 218 in the short side direction. The wiring patterns 218b include terminal portions 218b1 arranged at the four corners (at the outer edge portions in the long side direction and the short side direction) of each LED board 218. On the other hand, the connecting and retaining members 222 include main body portions 222a with a relatively large short side dimension compared to the LED boards 218, as shown in FIGS. 11, 12, and 14. That is, the main body portion 222a has a larger width than the LED boards 218. Accordingly, in the attached state, the both outer edge portions of the main body portion 222a in the short side direction project out beyond the LED boards 218 with respect to the Z-axis direction. On the both outer edge portions (sandwiching the wiring portions 222b) of the main body portion 222a projecting out beyond the LED boards 218 in the attached state, fixing portions 222c to be fixed to the side plates 14b of the chassis 14 are formed. The fixing portions 222c are arranged at the outer edge portions of the main body portion 222a in the short side direction and the long side direction; namely, at the four corners of the main body portion 222a. In the attached state, a pair of the fixing portions 222c opposed to each other with respect to the Z-axis direction is arranged to sandwich the LED boards 218 from the outside in the short side direction. Thus, the stress from the fixing portions 222c locked on the side plates 14b of the chassis 14 directly acts on the LED boards 218. Therefore, the LED boards 218 can be stably retained with high retaining force. Further, in the side plates 14b, attaching holes 214c are respectively formed at positions corresponding to the respective fixing portions 222c.

As described above, according to the present embodiment, the at least two LED boards 218 have an elongated shape and are arranged parallel to each other along the long side direction. The connecting and retaining members 222 have a larger width dimension than the short side dimension of the adjacent LED boards 218, and include the fixing portions 222c projecting out beyond the adjacent LED boards 218 and to be fixed to the chassis 14. In this way, because the fixing portions 222c are provided at the projected portions of the connecting and retaining members 222 beyond the LED boards 218, electrical connection can be established via the entire areas of the opposed surfaces of the LED boards 218 and the connecting and retaining members 222. Thus, a high degree of freedom can be ensured in designing the electrical connection configuration of the LED boards 218 and the connecting and retaining members 222.

At least one pair of the fixing portions 222c is provided across the adjacent LED boards 218. In this way, the LED boards 218 can be more stably retained and the electrical connected state can be stably maintained.

The fixing portions 222c are provided at the four corners of the connecting and retaining members 222. In this way, the connecting and retaining members 222 can be stably fixed with respect to the chassis 14. Therefore, the adjacent LED boards 218 can be more stably retained.

Fourth Embodiment

A fourth embodiment of the present invention will be described with reference to FIG. 15. According to the fourth embodiment, connecting and retaining members 322 have a structure modified from the first embodiment. Redundant description of structures, operations, and effects similar to those of the first embodiment will be omitted.

Figure 15:
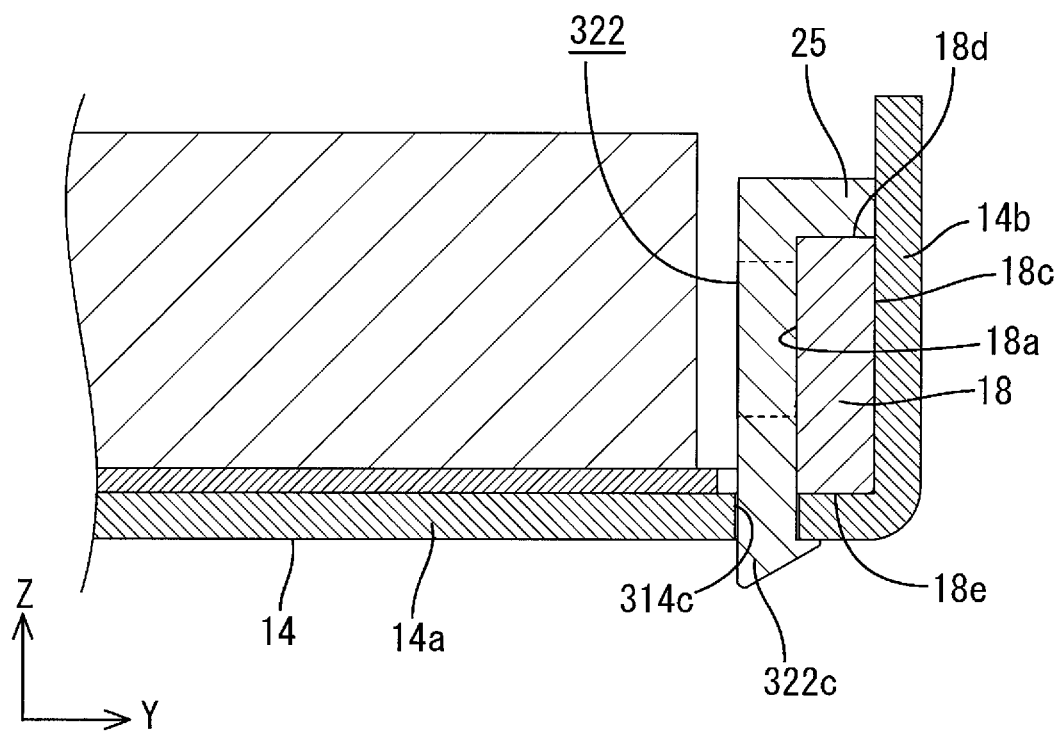
FIG. 15 is a cross section view showing an arrangement configuration of the chassis, the LED board, and the connecting and retaining member according to the fourth embodiment of the present invention.

As shown in FIG. 15, the connecting and retaining members 322 according to the present embodiment include a fixing portion 322c to be fixed to the bottom plate 14a of the chassis 14. The fixing portion 322c projects outward from the one of the outer edge portions of a main body portion 322a in the short side direction, which is on the side of the bottom plate 14a. The bottom plate 14a has attaching holes 314c through which the fixing portions 322c are inserted and locked. On one of the both outer edge portions of the main body portion 322a in the short side direction, which is on the side opposite to the fixing portion 322c, an abutted portion 25 is formed. The abutted portion 25 projects outward along the Y-axis direction (toward the side plates 14b) and is configured to be abutted on a side surface 18d on the front side of the LED boards 18, the side surface 18d being adjacent to both the mounting surfaces 18a and an opposite surface 18c thereof. The abutted portion 25 projects toward the side plates 14b while bent from the main body portion 322a at substantially right angles, with a projecting dimension substantially identical to the plate thickness dimension of the LED boards 18. Thus, the abutted portion 25 is substantially entirely abutted on the side surface 18c of the LED boards 18 on the front side thereof with respect to the plate thickness direction (Y-axis direction). Further, a side surface 18e of the LED boards 18 on the opposite side (back side) of the side surface 18d on the front side is abutted on the bottom plate 14a of the chassis 14. Thus, the LED boards 18 are surrounded by and abutted on the connecting and retaining members 322 and the chassis 14 throughout the periphery where the LED boards 18 are retained by the connecting and retaining members 322. Accordingly, the heat from the LED boards 18 can be efficiently transmitted to the connecting and retaining members 322 and the chassis 14, thereby to obtain a high heat dissipating property.

As described above, according to the present embodiment, the connecting and retaining members 322 are abutted on the side surface 18d of the adjacent LED boards 18, which is adjacent to both the mounting surface 18a and the opposite surface 18c thereof. In this way, the connecting and retaining members 322 are abutted on the mounting surface 18a for the LEDs 17 and the side surface 18d of the LED boards 18 respectively. Therefore, a large contact area can be obtained between the LED boards 18 and the connecting and retaining members 322. Accordingly, the heat generated from the LED boards 18 when the LEDs 17 are turned on can be efficiently transmitted to the connecting and retaining members 322, thereby to obtain a high heat dissipating property.

Of the side surfaces 18d and 18e of the adjacent LED boards 18, the side surface 18d is abutted on the connecting and retaining members 322 while the side surface 18e on the opposite side of the side surface 18d is abutted on the chassis 14. In this way, the heat generated from the LED boards 18 when the LEDs 17 are turned on can be efficiently transmitted to the connecting and retaining members 322 and the chassis 14. Therefore, a higher heat dissipating property can be obtained.

The fourth embodiment of the present invention has been described above. However, the present invention is not limited to the foregoing embodiment and may include the following modifications. In the following modifications, members similar to those according to the foregoing embodiment will be designated with similar signs, and their illustration in the drawings and description will be omitted.

First Modification of the Fourth Embodiment

A first modification of the fourth embodiment will be described with reference to FIG. 16. In the present modification, a second fixing portion 26 is added.

Figure 16:
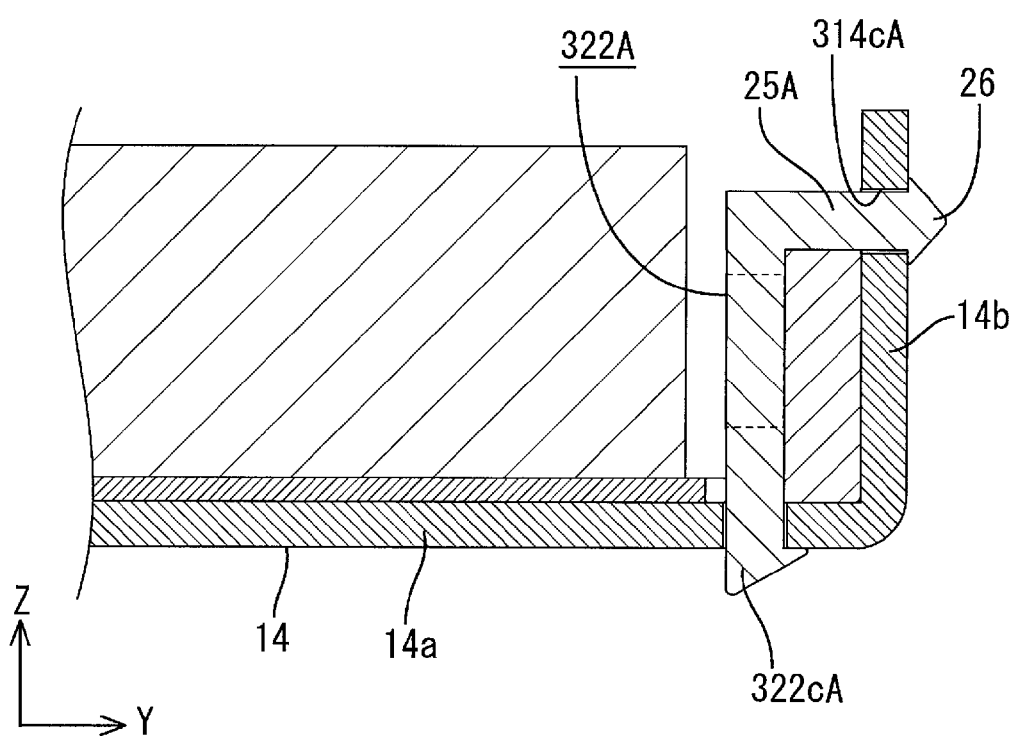
FIG. 16 is a cross section view showing an arrangement configuration of the chassis, the LED board, and the connecting and retaining member according to the first modification of the fourth embodiment of the present invention.

As shown in FIG. 16, connecting and retaining members 322A according to the present modification include a first fixing portion 322cA to be fixed to the bottom plate 14a of the chassis 14 and the second fixing portion 26 to be fixed to the side plates 14b. The first fixing portions 322cA have a configuration similar to the fixing portions 322c according to the fourth embodiment. The second fixing portion 26 projects further outward from an abutted portion 25A along the Y-axis direction (toward the side plates 14b), and is configured to be inserted into and locked in an attaching hole 314cA formed in the side plates 14b. In this way, the connecting and retaining members 322A can be more stably fixed to the chassis 14.

Second Modification of the Fourth Embodiment

A second modification of the fourth embodiment will be described with reference to FIG. 17. According to the present modification, a second fixing portion 26B and a chassis 14B have structures modified from the first modification.

Figure 17:
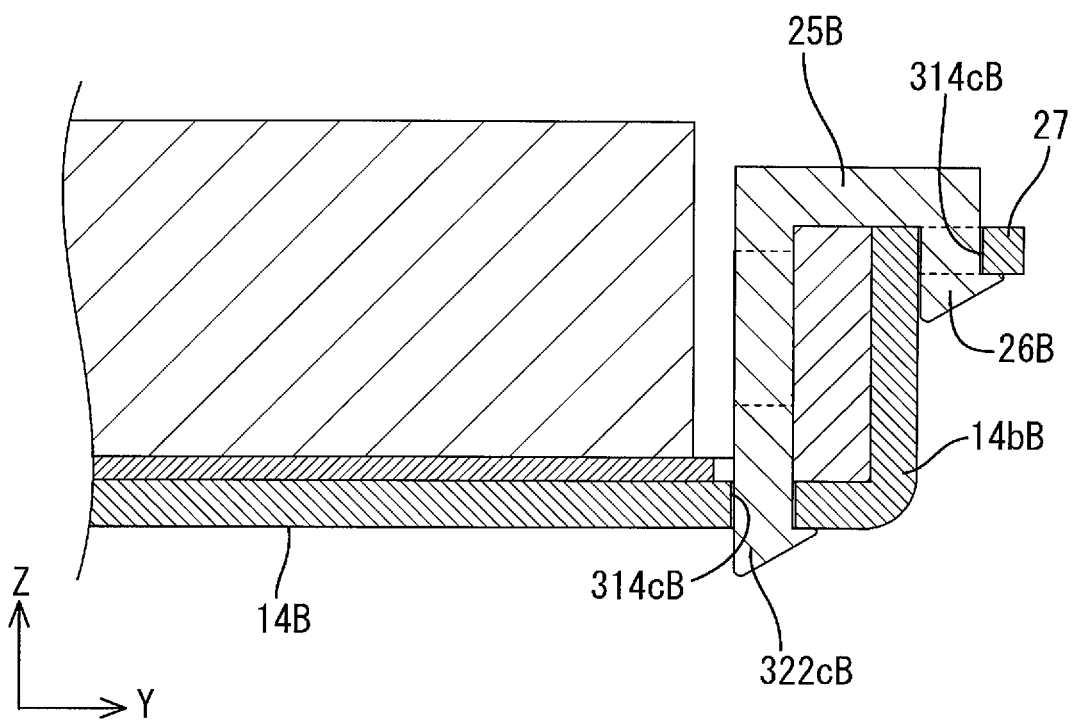
FIG. 17 is a cross section view showing an arrangement configuration of the chassis, the LED board, and the connecting and retaining member according to the second modification of the fourth embodiment of the present invention.

As shown in FIG. 17, an extension plate 27 extends outward from the rising edge of a side plate 14bB of the chassis 14B along the Y-axis direction. The second fixing portion 26B projects outward from an abutted portion 25B of connecting and retaining members 322B along the Y-axis direction and then further along the Z-axis direction toward the back side, namely, toward the extension plate 27, where the second fixing portion 26B is inserted into and locked in an attaching hole 314cB formed in the extension plate 27. In this way, when attaching or detaching the connecting and retaining members 322B to or from the chassis 14B, a first fixing portion 322cB and the second fixing portion 27B can be inserted into or removed from the corresponding attaching holes 314cB in the same Z-axis direction. Thus, excellent workability can be obtained.

Fifth Embodiment

A fifth embodiment of the present invention will be described with reference to FIGS. 18 to 20. The fifth embodiment differs from the first embodiment in that a backlight unit 412 of a direct type is used. Redundant description of structures, operations, or effects similar to those of the first embodiment will be omitted.

As shown in FIG. 18, a liquid crystal display device 410 according to the present embodiment has a configuration in which a liquid crystal panel 411 and the direct type backlight unit 412 are integrated with the use of a bezel 413 and the like. The configuration of the liquid crystal panel 411 is similar to the first embodiment and therefore redundant description is omitted. In the following, a configuration of the direct type backlight unit 412 will be described.

As shown in FIG. 18, the backlight unit 412 includes a substantially box-shaped chassis 414 with an opening on the side of the light output surface (facing the liquid crystal panel 11), a group of optical members 415 arranged to cover the opening of the chassis 414, and a frame 416 arranged along the outer edge portions of the chassis 414 and retaining the outer edge portions of the group of optical members 415 sandwiched between with the chassis 414. Further, the chassis 414 includes LEDs 417 immediately under the optical members 415 (liquid crystal panel 411) in an opposed manner the optical members 415, LED boards 418 on which the LEDs 417 are mounted, and diffuser lenses 28 to be attached to the LED boards 418 at positions corresponding to the LEDs 417. In addition, the chassis 414 includes a reflection sheet 29 reflecting the light in the chassis 414 toward the optical members 415. Because the backlight unit 412 according to the present embodiment is of the direct type, the light guide member 19 used in the edge-light type backlight unit 12 according to the first embodiment is not provided. The configuration of the optical members 415 is similar to the first embodiment and therefore redundant description is omitted. The configuration of the frame 416 is similar to the first embodiment with the exception that the first reflection sheet 20 is not provided; thus, description of the configuration of the frame 416 is omitted. In the following, the constituent parts of the backlight unit 412 will be described in detail.

Figure 19:
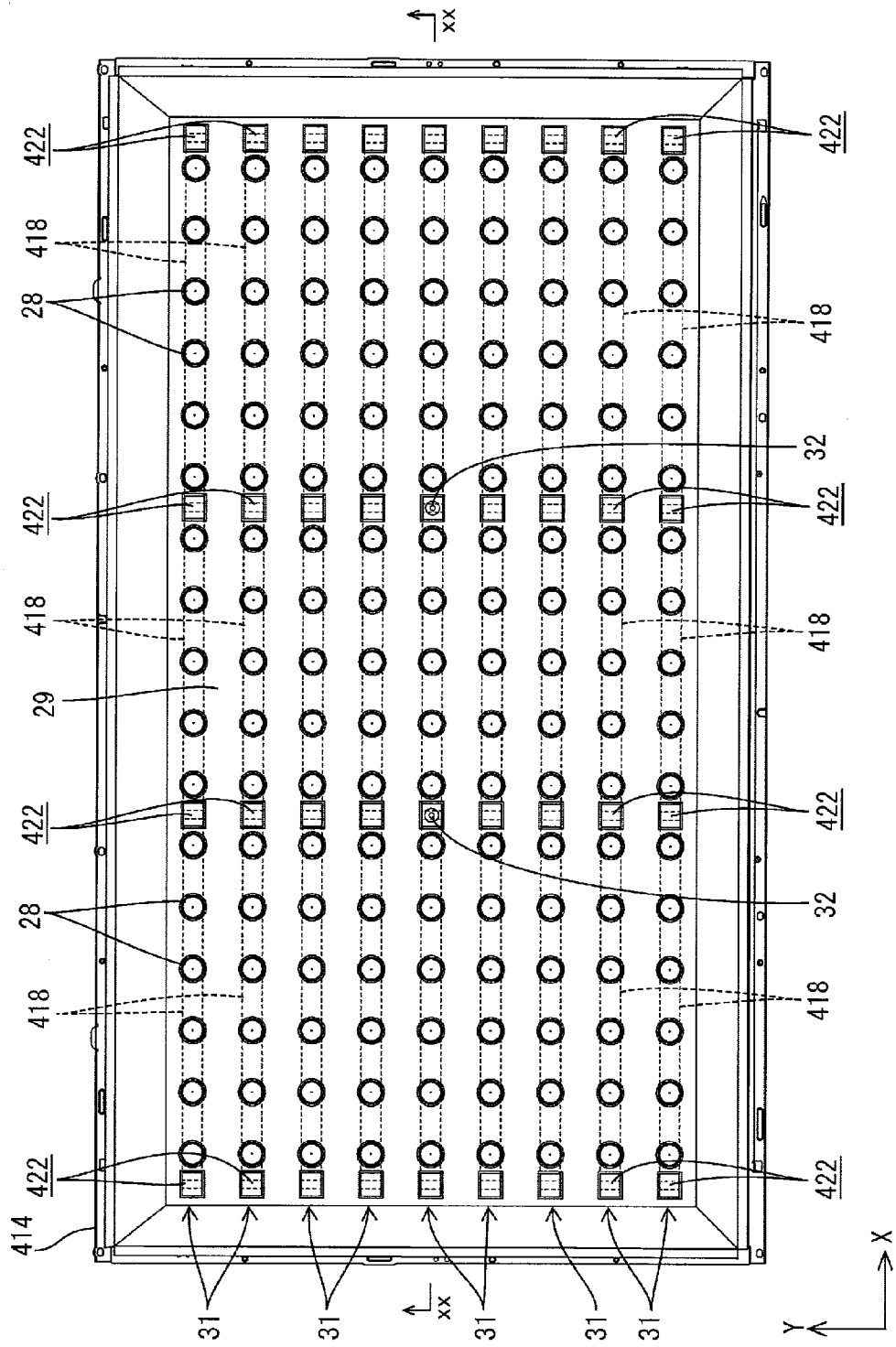
FIG. 19 is a plan view showing an arrangement configuration of diffuser lenses, LED boards, a reflection sheet, and the connecting and retaining members in the chassis of the liquid crystal display device.
Figure 20:
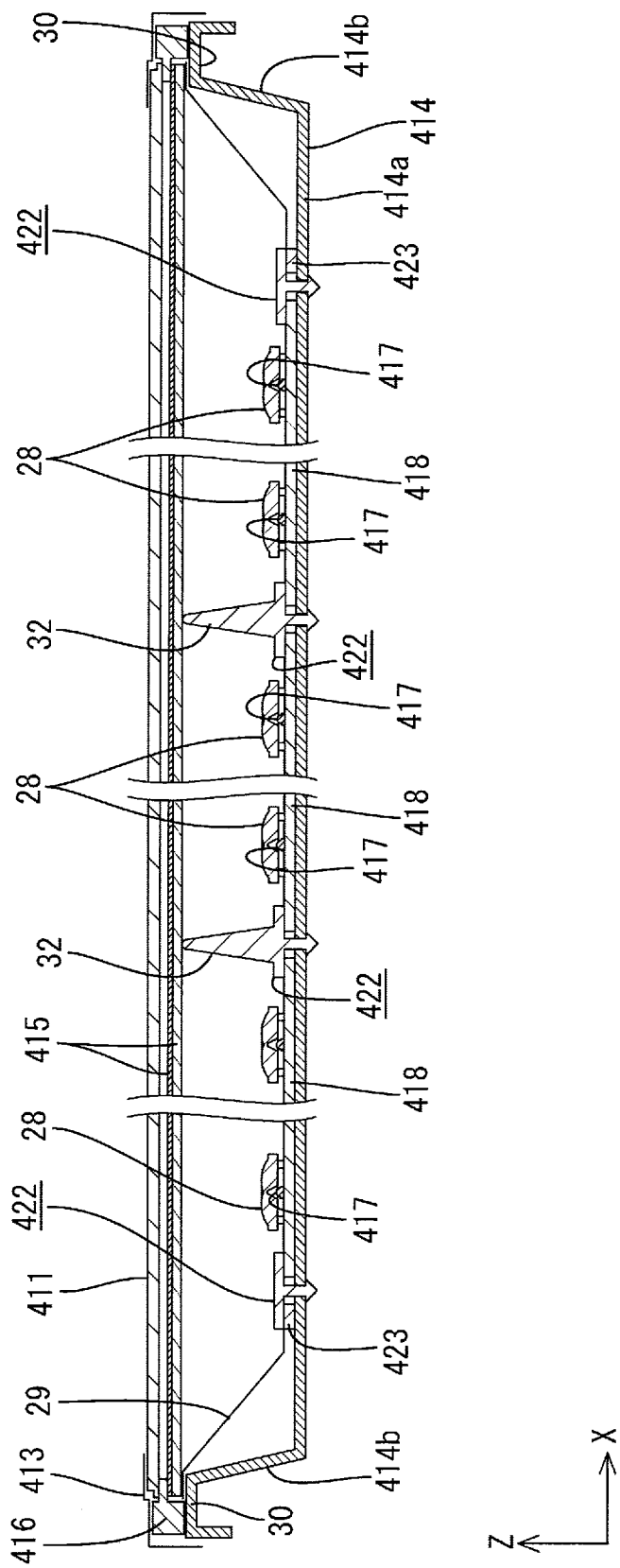
FIG. 20 is a cross section view taken along a line xx-xx of FIG. 19.

As shown in FIGS. 19 and 20, the chassis 414, which may be made of a metal, includes a bottom plate 414a with an horizontally long square (rectangular or horizontally long) shape similar to the liquid crystal panel 411; side plates 414b rising from the outer ends of the bottom plate 414a on the sides thereof (a pair of long sides and a pair of short sides) toward the front side (light output side); and backing plates 30 extending outward from the rising ends of the side plates 414b. As a whole, the chassis 414 has a shallow, substantially box-like shape (substantially shallow dish shape) opening toward the front side. The chassis 414 has a long side direction aligned with the X-axis direction (horizontal direction) and a short side direction aligned with the Y-axis direction (vertical direction). On the backing plates 30 of the chassis 414, the frame 416 and the optical members 415 can be placed from the front side. The optical member 415 will be described below. The frame 416 may be screwed to the backing plates 30. The bottom plate 414a of the chassis 414 has attaching holes 414c through which connecting and retaining members 422 are attached.

Next, the LED boards 418 on which the LEDs 417 are mounted will be described. The configuration of the LEDs 417 is similar to the first embodiment and redundant description of it will be omitted. The LED boards 418, as shown in FIGS. 19 and 20, include a base member which is horizontally long square shaped in plan view. The LED boards 418 are housed in the chassis 414 to extend along the bottom plate 414a with a long side direction thereof aligned with the X-axis direction and a short side direction thereof aligned with the Y-axis direction. The LEDs 417 are surface-mounted on one of the plate surfaces of the base member of the LED boards 418 that faces the front side (the surface facing the optical members 415). The LEDs 417 have a light emitting surface opposed to the optical members 415 (liquid crystal panel 411) with an optical axis thereof aligned with the Z-axis direction, which is orthogonal to the display surface of the liquid crystal panel 411. A plurality of LEDs 417 is arranged linearly parallel to each other along the long side direction (X-axis direction) of the LED boards 418, and connected in series by a wiring pattern formed on the LED boards 418. The LEDs 417 have a substantially constant arrangement pitch; namely, the LEDs 417 are arranged at regular intervals.

As shown in FIG. 19, a plurality of LED boards 418 with the above-described configuration is arranged side by side parallel to each other along the X-axis direction and the Y-axis direction within the chassis 414, with their long side directions and short side directions respectively aligned. In other words, the LED boards 418 and the LEDs 417 mounted thereon are arranged in rows and columns (i.e., in a matrix and in a planar fashion) in the chassis 414, the row direction corresponding to the X-axis direction (long side direction of the chassis 414 and the LED boards 418) and the column direction corresponding to the Y-axis direction (short side direction of the chassis 414 and the LED boards 418). Specifically, a total of 27 LED boards 418 are arranged side by side in the chassis 414; namely, three LED boards 418 arranged along the X-axis direction times nine LED boards 418 arranged along the Y-axis direction. According to the present embodiment, two types of the LED boards 418 are used, which differ in the long side dimension (length in the long side direction) and the number of the LEDs 417 that are mounted. Specifically, one type of the LED boards 418 is a six-mounted type with six LEDs 417 and a relatively large long side dimension. The other type is a five-mounted type with five LEDs 417 and a relatively small long side dimension. The chassis 414 has one six-mounted type at each of the both end positions and one five-mounted type at the central position, parallel to each other along the X-axis direction.

The three LED boards 418 arranged parallel to each other in the X-axis direction, i.e., along the long side direction of the LED boards 418, are mutually electrically connected by the connecting and retaining members 422 and also electrically connected to the external power supply board via external connection members 423. Thus, the LEDs 417, arranged on the LED boards 418 arranged parallel to each other along the X-axis direction to form each of the rows, are connected in series. Therefore, turning-on and off of a number of the LEDs 417 in each row of the LED boards 418 can be controlled at once by a single drive control circuit, thus contributing to cost reduction. The three LED boards 418 arranged parallel to each other along the X-axis direction to form a row constitute an LED board group 31. Thus, in the chassis 414, nine LED board groups 31 are arranged side by side parallel to each other intermittently along the Y-axis direction, i.e., with respect to the short side direction of the LED boards 418. The LED board groups 31 (LED boards 418) adjacent to each other in the Y-axis direction may have substantially regular intervals (arrangement pitch) there between. The arrangement pitch of the LEDs 417 is substantially the same with respect to the short side dimension and the X-axis direction even for the LED boards 418 different in the long side dimension and the number of LEDs 417 mounted.

Thus, a plurality of LED boards 418 different in the long side dimension and the number of LEDs 417 mounted may be appropriately arranged in combination parallel to each other along the X-axis direction, and are mutually electrically connected to obtain the following effects. Namely, a wide variety of the liquid crystal display devices 410 with different screen sizes (the backlight units 412 with different sizes) can be readily manufactured by determining the type of the LED boards 418 to be used and the number of the LED boards 418 of a particular type to be used, depending on the screen size. Compared with the case where specially designed LED boards with the same long side dimension as the one of the chassis 414 are prepared for each screen size, required types of the LED boards 418 can be greatly decreased, thus contributing to reduction in manufacturing cost. For example, in addition to the two types of the LED boards 418 (the five-mounted type and the six-mounted type), an eight-mounted type with eight LEDs 417 may be provided and the three types of LED boards 418 may be used in combination as desired. In this way, the liquid crystal display device 10 with the screen size of 26 inches, 32 inches, 37 inches, 40 inches, 42 inches, 46 inches, 52 inches, and 65 inches, for example, can be readily manufactured at low cost.

The diffuser lenses 28 may be made of a substantially transparent (highly light transmissive) synthetic resin material having a higher refractive index than air (such as polycarbonate or acrylic material). As shown in FIGS. 19 and 20, the diffuser lenses 28 have a predetermined thickness and are formed in a substantially circular shape in plan view. The diffuser lenses 28 are attached to the LED boards 418 to cover the LEDs 417 individually from the front side, i.e., to overlap with the LEDs 417 in plan view. The diffuser lenses 28 are configured to diffuse the highly directional light emitted by the LEDs 417 as the light is output. Namely, the directionality of the light emitted by the LEDs 417 is decreased as the light passes through the diffuser lenses 28 to prevent the areas between the adjacent LEDs 417 from being visually recognized as dark areas even when the intervals between the LEDs 417 are large. Thus, the number of LEDs 417 installed can be decreased. The diffuser lenses 28 are arranged at substantially concentric positions with respect to the LEDs 417 in plan view.

Next, the reflection sheet 29 will be described. The reflection sheet 29, which may be made of a synthetic resin with a white surface of high optical reflectivity, is sized to substantially cover the entire inner surface of the chassis 414, i.e., to cover all of the LED boards 418 arranged along the bottom plate 414a in a planar manner. In the reflection sheet 29, holes for the diffuser lenses 28 and the connecting and retaining members 422 passing therethrough are formed at the respectively corresponding positions.

As shown in FIGS. 19 and 20, the connecting and retaining members 422 are arranged between the adjacent LED boards 418 with respect to the X-axis direction, and between the LED boards 418 arranged at the both ends in the X-axis direction and the external connection members 423. Two of the connecting and retaining members 422, which are arranged at the center with respect to the Y-axis direction between the adjacent LED boards 418 with respect to the X-axis direction, have support portions 32 projecting toward the front side, i.e., toward the optical members 415. The support portions 32 are configured to support the optical members 415 from the back side. Therefore, a constant positional relationship can be maintained between the LEDs 417 or the diffuser lenses 28 and the optical members 415 with respect to the Z-axis direction. Thus, the light output from the LEDs 417 and the diffuser lenses 28 can be evenly output via the optical members 415.

As described above, according to the present embodiment, the chassis 414 includes the bottom plate 414a arranged on the side opposite to the light output side with respect to the at least two LED boards 418 and supporting the LED boards 418. The optical members 415 are arranged on the light output side in such a manner as to be opposed to the bottom plate 414a and the LED boards 418. In this way, the light emitted by the LEDs 417 on the LED boards 418 is radiated onto the optical members 415 arranged on the light output side in an opposed manner with respect to the bottom plate 414a and the LED boards 418, and then output to the outside via the optical members 415.

The connecting and retaining members 422 have the support portions 32 projecting toward the light output side and supporting the optical members 415. In this way, a constant interval can be maintained between the LEDs 417 and the optical members 415. Therefore, unevenness in the output light is not likely to occur.

The at least two LED boards 418 have an elongated shape and are arranged parallel to each other along the long side direction thereof. The at least two LED boards 418 include a plurality of types different in lengths in the long side direction. In this way, a plurality of LED boards 418 of different lengths in the long side direction can be used in combination to be arranged parallel to each other in the long side direction. Thus, a plurality of types of the backlight unit 412 with different sizes can be readily manufactured by using the backlight unit 412 of various sizes.

At least two LED boards 418 include ones that are arranged parallel to each other along the long side direction and mutually connected by the connecting and retaining members 422, which constitutes the LED board group 31. A plurality of the LED board groups 31 are arranged side by side intermittently in the short side direction of the LED boards 418. In this way, the size of the backlight unit 412 can be suitably increased.

On the light output side of the LEDs 417, the diffuser lenses 28 diffusing the light from the LEDs 417 are arranged. In this way, the light emitted by the LEDs 417 can be diffused by the diffuser lenses 28 as the light is output. Thus, unevenness in the output light prevented. Therefore, the number of the LEDs 417 installed can be decreased, thus achieving cost reduction.

Other Embodiments

The present invention is not limited to any of the foregoing embodiments described with reference to the drawings and may include the following embodiments in its technical scope.

(1) While in the foregoing embodiments, a gap is provided between the adjacent LED boards, the adjacent LED boards may be abutted onto each other without any gap.

(2) While in the foregoing embodiments the LED boards adjacent to each other in the long side direction thereof are connected and retained by the connecting and retaining members, a configuration in which the LED boards adjacent to each other in the short side direction thereof are connected and retained by the connecting and retaining members is also included in the present invention. For example, a configuration in which the LED boards are arranged in a direction (diagonal direction) intersecting both the long side direction and the short side direction and in which the LED boards adjacent to each other in the arranged direction are connected and retained by the connecting and retaining members is also included in the present invention.

(3) While in the foregoing embodiments the connecting and retaining members have an elongated shape similar to the LED boards, the specific shape of the connecting and retaining members may be appropriately modified into, for example, a square, triangular, circular, or elliptical shape. A configuration in which the connecting and retaining members have an elongated shape with the long side direction aligned with the short side direction of the LED boards is also included in the present invention.

(4) While in the foregoing embodiments the wiring portions of the connecting and retaining members are entirely exposed, a configuration may be adopted in which, for example, only the both end portions of the wiring portions in the length direction are exposed, with the central portion covered by an insulating layer.

(5) The white surface of the connecting and retaining member or the LED board may be provided by applying white paint onto the surface of a non-white base member material, besides using a white base member material.

(6) According to the first embodiment, three LED boards with the same long side dimension and the same number of LEDs mounted are arranged parallel to each other. Preferably, the technical features of the fifth embodiment may be adopted, where a plurality of types of LED boards with different long side dimensions and different numbers of LEDs mounted are appropriately combined. In this way, liquid crystal display devices of various screen sizes with the edge-light type backlight unit can be readily manufactured at low cost.

(7) According to the second embodiment, the inclined surfaces are formed on the surface of the connecting and retaining members. Preferably, a configuration in which the connecting and retaining members have an arched surface on the surface to be in a mountain shape is also included in the present invention.

(8) Other than the third embodiment, the number or position of the fixing portion on the main body portion of the connecting and retaining members may be appropriately modified. For example, the fixing portion may be arranged in the same way as the first embodiment, or the fixing portion may extend the entire length of the connecting and retaining members.

(9) The configuration of the connecting and retaining members according to the second through fourth embodiments may be applied to the direct type backlight unit according to the fifth embodiment.

(10) While in the foregoing embodiments the LED boards have the base member with a plate shape, a configuration in which a flexible wiring board is used as the LED board base member is also included in the present invention.

(11) According to the first embodiment, a pair of the LED boards (LED) is respectively arranged at the end portions of the chassis (light guide member) on both long sides thereof. A configuration in which, for example, a pair of the LED boards (LED) is respectively arranged at each end portion of the chassis (light guide member) on the short sides thereof is also included in the present invention.

(12) Other than (11), the present invention also includes a configuration in which pairs of the LED boards (LED) are arranged at the end portions of the chassis (light guide member), one pair on the long sides and another pair on the short sides thereof. The present invention also includes configuration in which, conversely, a single LED board (LED) is arranged at only one of end portions of the chassis (light guide member) on the long sides or the short sides.

(13) Other than the various embodiments described above, the number of the LEDs mounted on the LED board, for example, may be appropriately modified.

(14) While in the foregoing embodiments the LED boards have an elongated shape, a configuration in which the LED boards have a square shape, for example, is also included in the present invention.

(15) While the foregoing embodiments adopt the LEDs of the type including a blue LED chip emitting the single color of blue and configured to emit white light through a phosphor, a configuration adopting the LEDs of the type including an LED chip emitting the single color of ultraviolet light (blue-violet light) and configured to emit white light by using a phosphor is also included in the present invention.

(16) While the foregoing embodiments adopt the LEDs of the type including an LED chip emitting the single color of blue and configured to emit white light by using a phosphor, a configuration adopting the LEDs of the type including three types of LED chips respectively emitting the single colors of red, green, and blue is also included in the present invention. In addition, a configuration adopting the LEDs of the type including three types of LED chips emitting the single colors of C (cyan), M (magenta), and Y (yellow) is also included in the present invention.

(17) In the foregoing embodiments, the liquid crystal panel and the chassis are vertically arranged with their short side direction aligned with the vertical direction by way of example. However, the present invention also includes the liquid crystal panel and the chassis vertically arranged with their long side direction aligned with the vertical direction.

(18) In the foregoing embodiments, TFT is used as a switching component of a liquid crystal display device. However, the present invention is also applicable to a liquid crystal display device using switching components (such as a thin-film diode (TFD)) other than TFT. In addition, the present invention is applicable not only to a liquid crystal display device of colored display, but also to a liquid crystal display device of monochrome display.

(19) In the foregoing embodiments, the liquid crystal display device includes the liquid crystal panel as a display panel. However, the display device may include other type of display panel.

(20) In the foregoing embodiments, the television receiver includes a tuner. However, the display device may not include a tuner.

EXPLANATION OF SYMBOLS 10,410: Liquid crystal display device (Display device)
11, 411: Liquid crystal panel (Display panel)
12, 412: Backlight unit (Lighting device)
14, 414: Chassis
14a, 414a: Bottom plate (Bottom portion)
14b: Side plate (Side portion)
415: Optical member
17, 417: LED (Light source)
18, 218, 418: LED board (Light source board)
18a: Mounting surface
18b, 218b: Wiring pattern
18b1, 218b1: Terminal portion (Abutting portion)
18d, 18e: Side surface
19: Light guide member
20: First reflection sheet (Reflection member)
21: Second reflection sheet (Reflection member)
22, 122, 222, 322, 322A, 322B, 422: Connecting and retaining member
22b, 222b: Wiring portion
22c, 222c, 322c: Fixing portion
24: Inclined surface
26, 26B: Second fixing portion (Fixing portion)
28: Diffuser lens
31: LED board group
32: Support portion
322cA, 322cB: First fixing portion (Fixing portion)
C: Gap
TV: Television receiver

The invention claimed is:

1. A lighting device comprising:
a plurality of light sources;
at least two light source boards on which the light sources are mounted;
a chassis housing the at least two light source boards; and
at least one connecting and retaining member; wherein
the at least two light source boards include light source boards arranged adjacent to each other;
the adjacent light source boards are electrically connected to each other and retained on the chassis with a connecting and retaining member;
the connecting and retaining member sandwiches the adjacent light source boards with the chassis;
the adjacent light source boards include a wiring pattern connected to the light sources on the light source mounting surface;
the connecting and retaining member includes a wiring portion formed on the surface opposed to the adjacent light source boards; and
the wiring portion is abutted on the wiring pattern.

2. The lighting device according to claim 1, wherein the adjacent light source boards have a gap therebetween.

3. The lighting device according to claim 2, wherein the at least two light source boards have an elongated shape and are arranged parallel to each other along a long side direction thereof.

4. The lighting device according to claim 3, wherein a plurality of the light sources is arranged parallel to each other on the at least two light source boards along the long side direction.

5. The lighting device according to claim 2, wherein:
the connecting and retaining member includes a fixing portion to be fixed to the chassis; and
the fixing portion is arranged between the adjacent light source boards.

6. The lighting device according to claim 1, wherein the connecting and retaining member has substantially the same overlapping area with respect to the adjacent light source boards.

7. The lighting device according to claim 1, wherein the wiring portion is entirely exposed to the adjacent light source boards.

8. The lighting device according to claim 1, wherein the wiring pattern includes an abutted portion to be abutted on the wiring portion at end portions of the adjacent light source boards.

9. The lighting device according to claim 1, wherein the connecting and retaining member is formed in a mountain shape spreading out toward the light source mounting surface of the adjacent light source boards.

10. The lighting device according to claim 9, wherein the connecting and retaining member includes an inclined surface.

11. The lighting device according to claim 1, wherein the connecting and retaining member is abutted on side surfaces of the adjacent light source boards, which are adjacent to both the light source mounting surface and an opposite surface of the light source mounting surface.

12. The lighting device according to claim 11, wherein:
one of the side surfaces of the adjacent light source boards is abutted on the connecting and retaining member; and
the other of the side surfaces on an opposite side is abutted on the chassis.

13. The lighting device according to claim 1, wherein the connecting and retaining member has a white surface.

14. The lighting device according to claim 1, wherein:
the at least two light source boards have an elongated shape and are arranged parallel to each other along a long side direction thereof; and
the connecting and retaining member has a width dimension substantially the same as a short side dimension of the light source boards.

15. The lighting device according to according to claim 1, wherein:

the at least two light source boards have an elongated shape and are arranged parallel to each other along a long side direction thereof;

the connecting and retaining member has a width dimension larger than a short side dimension of the adjacent light source boards; and the connecting and retaining member includes a fixing portion to be fixed to the chassis, the fixing portion projecting out beyond the adjacent light source boards.

16. The lighting device according to claim 15, wherein at least a pair of the fixing portions is arranged across the adjacent light source boards.

17. The lighting device according to claim 16, wherein the fixing portions are arranged at the four corners of the connecting and retaining member.

18. The lighting device according to claim 1, wherein the connecting and retaining member has a rotationally symmetric shape of two-fold symmetry.

19. The lighting device according to claim 1, wherein the at least two light source boards have white surfaces.

20. The lighting device according to claim 1, further comprising a light guide member, wherein the light guide member includes an end portion opposed to the light sources on the at least two light source boards.

21. The lighting device according to claim 20, wherein the chassis includes a bottom portion supporting the light guide member, and side portions rising from the bottom portion and sandwiching the adjacent light source boards with the connecting and retaining member.

22. The lighting device according to claim 20, further comprising a pair of reflection members, wherein:

the light sources and the end portion of the light guide member opposed to the light sources are arranged apart from each other with a space therebetween; and the pair of reflection members arranged across the space.

23. The lighting device according to claim 1, further comprising an optical member, wherein:

the chassis includes a bottom portion arranged on a side opposite to the light output side with respect to the at least two light source boards and supporting the light source boards; and the optical member is arranged on the light output side in such a manner as to be opposed to the bottom portion and the light source boards.

24. The lighting device according to claim 23, wherein the connecting and retaining member includes a support portion projecting toward the light output side and supporting the optical member.

25. The lighting device according to claim 23, wherein:

the at least two light source boards have an elongated shape and are arranged parallel to each other along a long side direction thereof; and the at least two light source boards include a plurality of types of light source boards with different lengths with respect to the long side direction.

26. The lighting device according to claim 25, wherein:

the at least two light source boards includes a group of the light source boards arranged parallel to each other along the long side direction and connected to each other by the connecting and retaining member; and a plurality of the groups of the light source boards are arranged side by side intermittently along the short side direction of the at least two light source boards.

27. The lighting device according to claim 23, further comprising a diffuser lens on the light output side of the light sources to diffuse the light from the light sources.

28. The lighting device according to claim 1, wherein the light source is an LED.

29. A display device comprising:

the lighting device according to claim 1; and a display panel configured to provide a display by utilizing the light from the lighting device.

30. The display device according to claim 29, wherein the display panel is a liquid crystal panel having liquid crystal contained between a pair of substrates.

31. A television receiver comprising the display device according to claim 29.

* * * * *